(12) United States Patent
Zhang et al.

(10) Patent No.: US 8,644,128 B2
(45) Date of Patent: Feb. 4, 2014

(54) MULTI-CLOCK PHY PREAMBLE DESIGN AND DETECTION

(75) Inventors: Hongyuan Zhang, Fremont, CA (US); Raja Banerjea, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 58 days.

(21) Appl. No.: 13/365,950

(22) Filed: Feb. 3, 2012

(65) Prior Publication Data

US 2012/0207231 A1 Aug. 16, 2012

Related U.S. Application Data

(60) Provisional application No. 61/441,610, filed on Feb. 10, 2011.

(51) Int. Cl.
*H04J 11/00* (2006.01)
*H04Q 7/00* (2006.01)

(52) U.S. Cl.
USPC .......................................... 370/203; 370/328

(58) Field of Classification Search
USPC ..................... 370/203–208, 328, 338, 503
See application file for complete search history.

(56) References Cited

U.S. PATENT DOCUMENTS

| 7,349,462 B2 * | 3/2008 | Schott et al. ................ 375/147 |
| 8,175,118 B2 * | 5/2012 | Zhang et al. ................ 370/474 |
| 8,175,119 B2 * | 5/2012 | Zhang et al. ................ 370/474 |
| 8,385,440 B2 * | 2/2013 | Zhang et al. ................ 375/260 |
| 2010/0046542 A1 * | 2/2010 | Van Zelst et al. ........... 370/465 |

OTHER PUBLICATIONS

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

(Continued)

*Primary Examiner* — Hong Cho

(57) ABSTRACT

In a method for generating a data unit for transmission via a communication channel, a first preamble portion of the data unit is generated based on whether a physical layer (PHY) mode is a first PHY mode or a second PHY mode. An OFDM portion of the data unit is generated. The OFDM portion follows the first preamble portion, includes a second preamble portion including one or more long training fields, is clocked at a first clock rate when the PHY mode is the first PHY mode, and is clocked at a second clock rate lower than the first clock rate when the PHY mode is the second PHY mode.

19 Claims, 23 Drawing Sheets

(56) References Cited

OTHER PUBLICATIONS

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

Stacey et al., "IEEE P802.11, Wireless LANs, Proposed TGac Draft Amendment," Institute of Electrical and Electronics Engineers, doc. No. IEEE 802.11-10/1361r3 (Jan. 2011).

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

International Search report and Written Opinion for International Application No. PCT/US2012/023807, dated Jun. 18, 2012.

Yu, et al. "Coverage extetion for IEEE802.11ah," *The Institute of Electrical and Electronics Engineers*, doc. No. IEEE 802.11-11/0035r1, (Jan. 2011).

U.S. Appl. No. 13/365,963, filed Feb. 3, 2012.

PCT Application No. PCT/US12/23807 filed Feb. 3, 2012.

\* cited by examiner

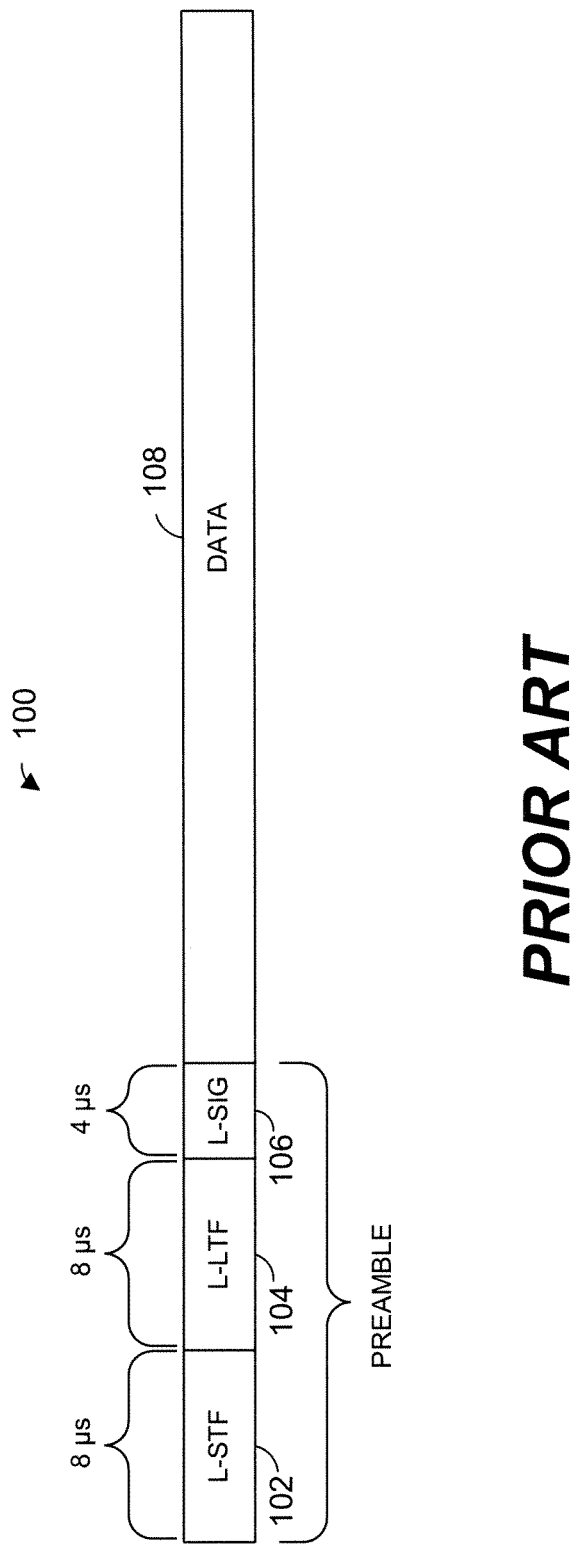

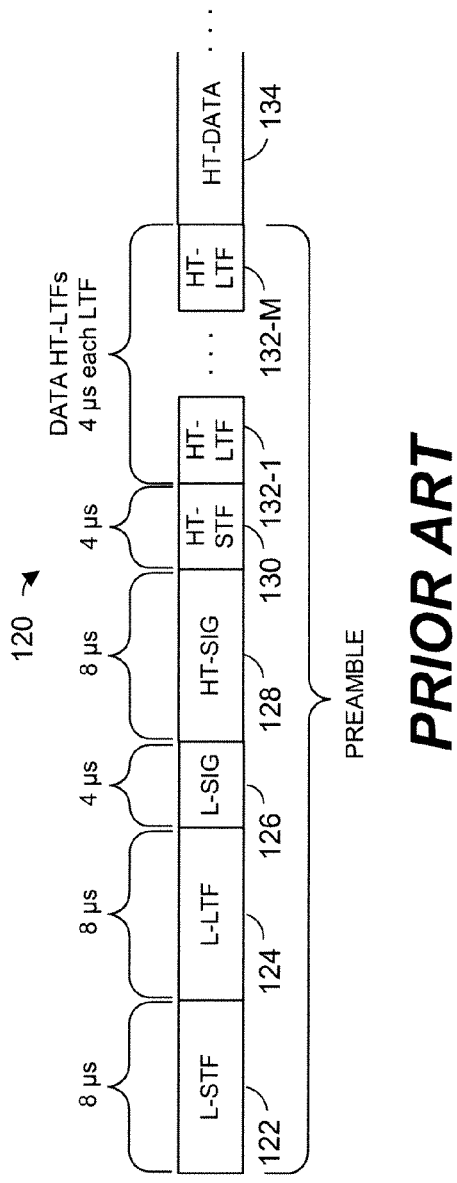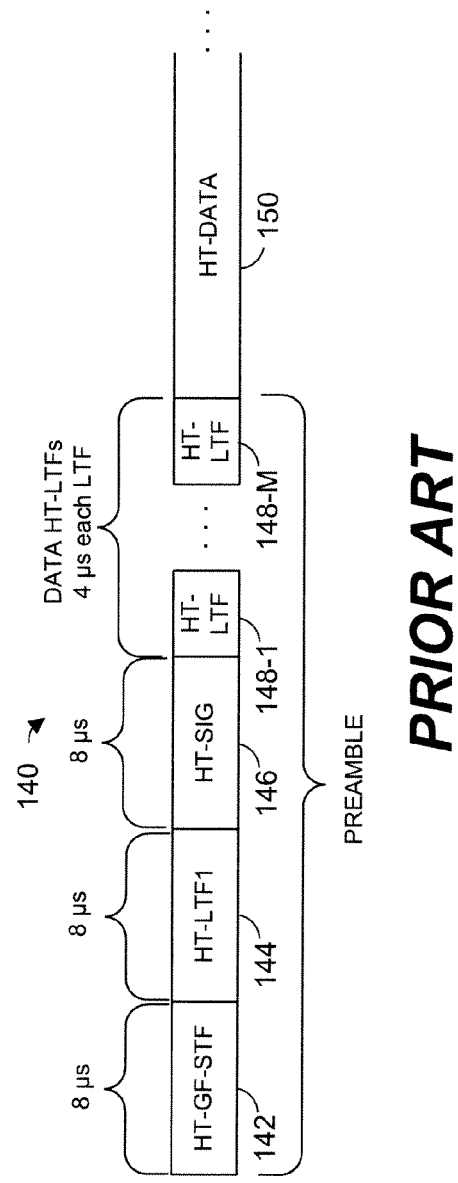

FIG. 6          PRIOR ART

MULTI-CLOCK PHY PREAMBLE DESIGN AND DETECTION

CROSS-REFERENCE TO RELATED APPLICATION

This disclosure claims the benefit of U.S. Provisional Patent Application No. 61/441,610, filed on Feb. 10, 2011, the disclosure of which is hereby incorporated by reference herein in its entirety.

This application is also related to the commonly-owned, co-pending patent application U.S. patent application Ser. No. 13/365,963, entitled "Multi-Clock PHY Preamble Design and Detection", filed on the same day as the present application and hereby incorporated by reference herein in its entirety.

FIELD OF THE DISCLOSURE

The present disclosure relates generally to communication networks and, more particularly, to wireless local area networks including physical layer modes with multiple clock rates.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the Gbps range.

Work has begun on two new standards, IEEE 802.11ah and IEEE 802.11af, each of which will specify wireless network operation in sub-1 GHz frequencies. Low frequency communication channels are generally characterized by better propagation qualities and extended propagation ranges compared to higher frequency communication channels. In the past, sub-1 GHz frequency ranges have not been utilized for wireless communication networks because such frequencies were reserved for other applications (e.g., licensed TV frequency bands, radio frequency band, etc.). There are few frequency bands in the sub-1 GHz range that remain unlicensed, with different unlicensed frequencies in different geographical regions. The IEEE 802.11ah Standard will specify wireless operation in available unlicensed sub-1 GHz frequency bands. The IEEE 802.11 of Standard will specify wireless operation in TV White Space (TVWS), i.e., unused TV channels in sub-1 GHz frequency bands.

SUMMARY

In one embodiment, a method for generating a data unit for transmission via a communication channel includes generating a first preamble portion of the data unit based on whether a physical layer (PHY) mode is a first PHY mode or a second PHY mode. The method also includes generating an OFDM portion of the data unit. The OFDM portion follows the first preamble portion, includes a second preamble portion including one or more long training fields, is clocked at a first clock rate when the PHY mode is the first PHY mode, and is clocked at a second clock rate lower than the first clock rate when the PHY mode is the second PHY mode.

In another embodiment, a communication device includes a network interface configured to generate a first preamble portion of a data unit based on whether a physical layer (PHY) mode is a first PHY mode or a second PHY mode. The network interface is also configured to generate an OFDM portion of the data unit. The OFDM portion follows the first preamble portion, includes a second preamble portion including one or more long training fields, is clocked at a first clock rate when the PHY mode is the first PHY mode, and is clocked at a second clock rate lower than the first clock rate when the PHY mode is the second PHY mode.

BRIEF DESCRIPTION OF THE DRAWINGS

FIG. 2 is a diagram of a prior art orthogonal frequency division multiplexing (OFDM) short range data unit that an AP and/or client station is configured to transmit via a communication channel, according to an embodiment.

FIG. 3 is a diagram of a prior art OFDM short range data unit that an AP and/or client station is configured to transmit via a communication channel, according to another embodiment.

FIG. 4 is a diagram of a prior art OFDM short range data unit that an AP and/or client station is configured to transmit via a communication channel, according to another embodiment.

DETAILED DESCRIPTION

Figure 1:
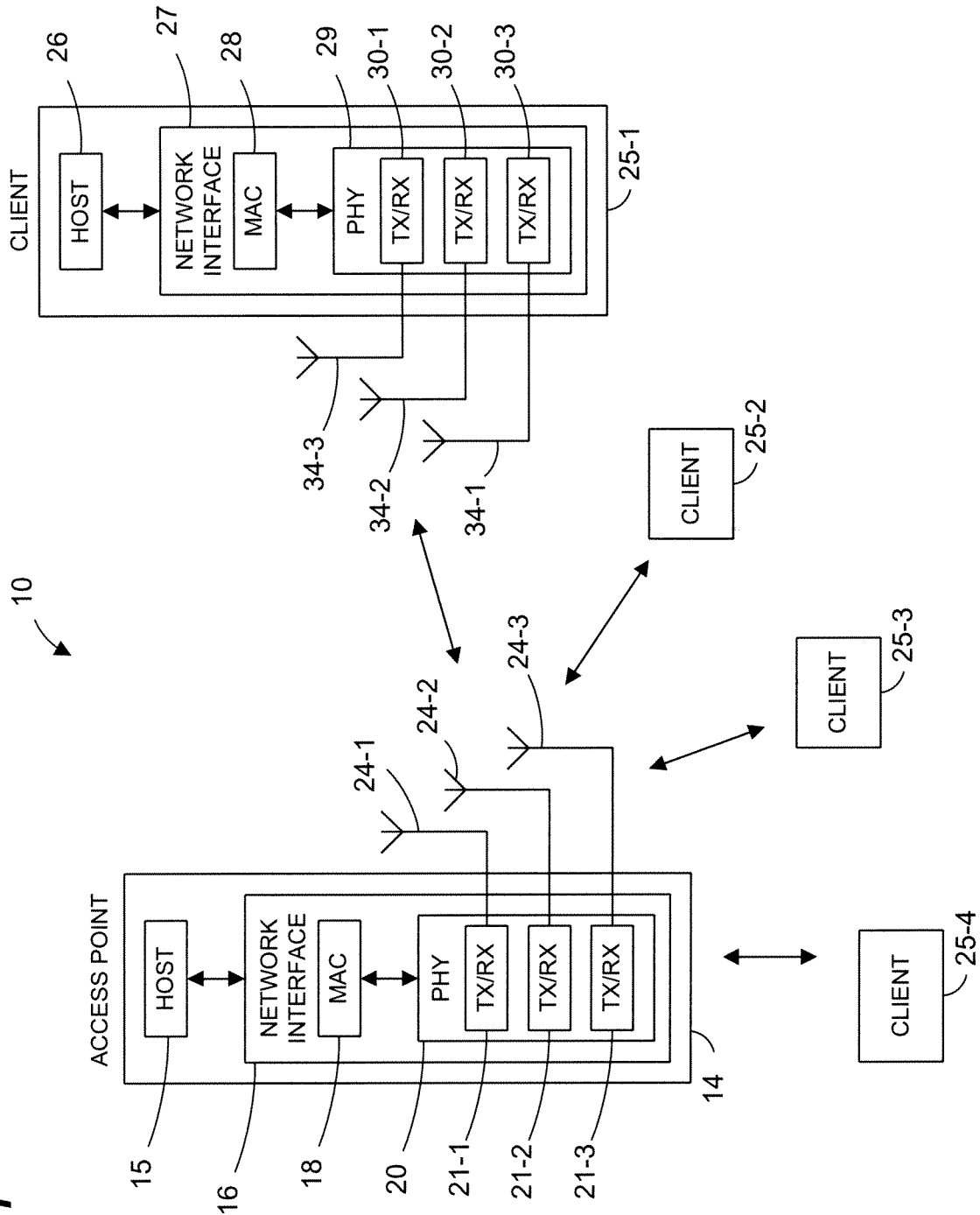
FIG. 1 is a block diagram of an example wireless local area network (WLAN), according to an embodiment.

In embodiments described below, a wireless network device such as an access point (AP) of a wireless local area network (WLAN) transmits data streams to, and/or receives data streams from, one or more client stations. The AP is configured to communicate with client stations according to at least a first communication protocol. The first communication protocol defines operation in a sub-1 GHz frequency range, and is typically used for applications requiring longer range wireless communication (as compared to WLAN systems that conform to the IEEE 802.11a, 802.11b, 802.11g, and 802.11n Standards) with relatively low data rates (as compared to WLAN systems that conform to the IEEE 802.11a, 802.11b, 802.11g, and 802.11n Standards). The first communication protocol (e.g., IEEE 802.11 of or IEEE 802.11ah) is referred to herein as a "long range" communication protocol. In some embodiments, the AP is also configured to communicate with client stations according to one or more other communication protocols which define operation in generally higher frequency ranges and are typically used for closer-range communications with higher data rates. The higher frequency communication protocols (e.g., IEEE 802.11a, IEEE 802.11n, and/or IEEE 802.11ac) are collectively referred to herein as "short range" communication protocols.

In some embodiments, the physical layer (PHY) data units conforming to the long range communication protocol ("long range data units") are the same as or similar to data units conforming to a short range communication protocol ("short range data units"), but are generated using a lower clock rate. For example, in an embodiment, a device (e.g., an AP) generates along range data unit by down-sampling or "down-clocking" a clock rate used to generate the short range data units. Accordingly, in some embodiments, a single communication device is capable of generating multiple types of data units (e.g., long range and short range data units), each type having a similar format but generated using a different clock rate. Thus, in some embodiments, two or more differently clocked data units corresponding to two or more different PHY modes coexist at the same time in the same region. In some embodiments, a single WLAN includes communications conforming to two or more long range communication modes, each utilizing data units that are down-clocked from a short range data unit (e.g., first and second PHY modes down-clocked to ¼ and ⅛, respectively, of the IEEE 802.11n data unit clock rate, in an embodiment).

All else being equal, an orthogonal frequency division multiplexing (OFDM) symbol generated using a faster clock is shorter in duration than an OFDM symbol generated using a slower clock. To properly demodulate received data units that include OFDM symbols (e.g., IEEE 802.11a, IEEE 802.11n, IEEE 802.11ac, IEEE 802.11af, and IEEE 802.11ah data units), a receiving device generally must know the clock rate that the transmitting device used to generate the received data unit. Accordingly, where different clock rates are used for different PHY modes in a single region and at the same time, communication devices without a priori knowledge must determine or auto-detect the clock rate of received data units. Various embodiments of data unit preamble designs, and corresponding receiver techniques for auto-detecting clock rates based on the preamble designs, are disclosed herein.

FIG. 1 is a block diagram of an example wireless local area network (WLAN) 10, according to an embodiment. An AP 14 includes a host processor 15 coupled to a network interface 16. The network interface 16 includes a medium access control (MAC) unit 18 and a PHY unit 20. The PHY unit 20 includes a plurality of transceivers 21, and the transceivers are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. The client station 25-1 includes a host processor 26 coupled to a network interface 27. The network interface 27 includes a MAC unit 28 and a PHY unit 29. The PHY unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments. In an embodiment, one, two, or three of the client stations 25-2, 25-3, and 25-4 have a structure the same as or similar to the client station 25-1. In these embodiments, the client stations 25 are structured the same as or similar to the client station 25-1 and have the same or a different number of transceivers and antennas. For example, the client station 25-2 has only two transceivers and two antennas, in an embodiment.

In various embodiments, the PHY unit 20 of the AP 14 is configured to operate in any of multiple PHY modes. In some embodiments, each PHY mode corresponds to a particular communication protocol, or to a particular mode of a communication protocol. As a result, in some embodiments, each PHY mode corresponds to using a particular clock rate to generate corresponding data units. For example, a first PHY mode corresponds to a short range communication protocol for which the PHY unit 20 generates data units using a first clock rate, and a second PHY mode corresponds to a long range communication protocol for which the PHY unit 20 generates data units using a second clock rate that is down-clocked from the first clock rate, in an embodiment. As another example, a first PHY mode corresponds to a short range communication protocol for which the PHY unit 20 generates data units using a first clock rate, a second PHY mode corresponds to a "regular" mode of a long range communication protocol for which the PHY unit 20 generates data units using a second clock rate that is down-clocked from the first clock rate (e.g., ¼ the first clock rate), and a third PHY mode corresponds to an "extended range" mode of the long range communication protocol for which the PHY unit 20 generates data units using a third clock rate that is further down-clocked from the first clock rate (e.g., ⅛ the first clock rate), in an embodiment.

The transceiver(s) 21 of the AP 14 is/are configured to transmit the generated data units via the antenna(s) 24. Similarly, the transceiver(s) 21 is/are configured to receive similar data units via the antennas) 24. In various embodiments, the PHY unit 20 of the AP 14 is further configured to process received data units (e.g., data units that conform to any of the communication protocols and PHY modes that the PHY unit 20 supports for transmission).

In some embodiments, the PHY unit 29 of the client station 25-1 is configured to generate data units conforming to only a single PHY mode that corresponds to a particular communication protocol and data unit clock rate. In other embodiments, the PHY unit 29, in a manner similar to the PHY unit 20, is configured to generate data units conforming to any of multiple PHY modes, with each PHY mode corresponding to a particular communication protocol (or a particular mode of a communication protocol) and a particular data unit clock rate.

The transceiver(s) 30 is/are configured to transmit the generated data units via the antenna(s) 34. Similarly, the transceiver(s) 30 is/are configured to receive data units via the antenna(s) 34. The PHY unit 29 of the client station 25-1 is further configured to process received data units (e.g., data units that conform to any of the communication protocols and PHY modes that the PHY unit 29 supports for transmission).

Similar to client station 25-1, each of client stations 25-2, 25-3, and 25-4 is configured to transmit and/or receive data units corresponding to only a single PHY mode, or data units corresponding to any one of multiple PHY modes, in various embodiments. In some embodiments, one or more of the client stations 25-1 through 25-4 is configured to transmit and/or receive data units corresponding to a PHY mode that is not supported by one or more others of the client stations 25-1 through 25-4. For example, in an embodiment, the client station 25-1 is configured to transmit and/or receive only short range data units clocked at a first rate, while the client station 25-2 is configured to transmit and/or receive only long range data units clocked at a second, slower rate.

FIG. 2 is a diagram of a prior art OFDM short range data unit 100 that an AP (e.g., AP 14 of FIG. 1) and/or a client station (e.g., client station 25-1 of FIG. 1) is configured to transmit via a communication channel, according to an embodiment. The data unit 100 conforms to the IEEE 802.11a Standard and occupies a 20 Megahertz (MHz) band. The data unit 100 includes a preamble having a legacy short training field (L-STF) 102, generally used for packet detection, initial synchronization, and automatic gain control, etc., and a legacy long training field (L-LTF) 104, generally used for channel estimation and fine synchronization. The data unit 100 also includes a legacy signal field (L-SIG) 106, used to carry certain PHY parameters of the data unit 100 such as the modulation type and coding rate used to generate the data unit 100, for example. The data unit 100 also includes a data portion 108. According to some embodiments and/or scenarios, the data portion 108 includes a service field, a scrambled PHY service data unit (PSDU), tail bits, and padding bits, if needed. The data unit 100 is designed for transmission over one spatial or space-time stream in a single input single output (SISO) channel configuration.

FIG. 3 is a diagram of a prior art OFDM short range data unit 120 that an AP (e.g., AP 14 of FIG. 1) and/or a client station (e.g., client station 25-1 of FIG. 1) is configured to transmit via a communication channel, according to another embodiment. The data unit 120 conforms to the IEEE 802.11n Standard, occupies a 20 MHz band, and corresponds to a "mixed" mode designed for scenarios where the WLAN includes both client stations that conform to the IEEE 802.11n Standard and client stations that conform to the IEEE 802.11a Standard but not the IEEE 802.11n Standard. The data unit 120 includes a preamble having an L-STF 122, an L-LTF 124, an L-SIG 126, a high throughput signal field (HT-SIG) 128, a high throughput short training field (HT-STF) 130, and M high throughput long training fields (HT-LTFs) 132-1 through 132-M, where M is an integer which generally corresponds to a number of spatial streams used to transmit the data unit 120 in a multiple input multiple output (MIMO) channel configuration. In particular, according to the IEEE 802.11n Standard, the data unit 120 includes two HT-LTFs 132 if the data unit 120 is transmitted using two spatial streams, and four HT-LTFs 132 if the data unit 120 is transmitted using three or four spatial streams. An indication of the particular number of spatial streams being utilized is included in the HT-SIG 128. The data unit 120 also includes a high throughput data portion (HT-DATA) 134.

Within the data unit 120, L-SIG 126 is modulated according to binary phase shift keying (BPSK), while HT-SIG 128 is modulated according to BPSK on the quadrature axis (Q-BPSK). In other words, the modulation of HT-SIG 128 is rotated by 90 degrees as compared to the modulation of L-SIG 126. Such modulation allows a receiving device to determine or auto-detect, without decoding the entire preamble, that the data unit 120 conforms to the IEEE802.11n Standard rather than the IEEE 802.11a Standard.

FIG. 4 is a diagram of a prior art OFDM short range data unit 140 that an AP (e.g., AP 14 of FIG. 1) and/or a client station (e.g., client station 25-1 of FIG. 1) is configured to transmit via a communication channel, according to another embodiment. The data unit 140 conforms to the IEEE 802.11n Standard, occupies a 20 MHz band, and corresponds to a "Greenfield" mode designed for scenarios where the WLAN does not include any client stations that conform to the IEEE 802.11a Standard but not the IEEE 802.11n Standard. The data unit 140 includes a preamble having a high throughput Greenfield short training field (HT-GF-STF) 142, a first high throughput long training field (HT-LTF1) 144, a HT-SIG 146, and M HT-LTFs 148-1 through 148-M, where M is an integer which generally corresponds to a number of spatial streams used to transmit the data unit 140 in a MIMO channel configuration. The data unit 140 also includes a data portion 150.

Figure 5:
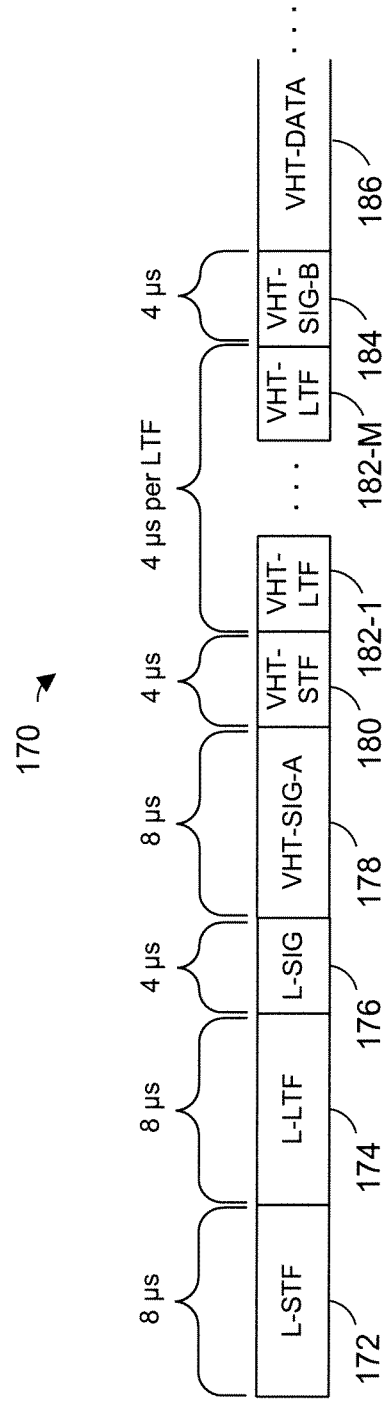
FIG. 5 is a diagram of a prior art OFDM short range data unit that an AP and/or client station is configured to transmit via a communication channel, according to another embodiment.

FIG. 5 is a diagram of a prior art OFDM short range data unit 170 that an AP (e.g., AP 14 of FIG. 1) and/or a client station (e.g., client station 25-1 of FIG. 1) is configured to transmit via a communication channel, according to another embodiment. The data unit 170 conforms to the IEEE 802.11ac Standard and is designed for scenarios where the WLAN includes both client stations that conform to the IEEE 802.11ac Standard and client stations that conform to the IEEE 802.11a Standard but not the IEEE 802.11ac Standard. The data unit 170 occupies a 20 MHz bandwidth. In other embodiments or scenarios, a data unit similar to the data unit 170 occupies a different bandwidth, such as a 40 MHz, an 80 MHz, or a 160 MHz bandwidth. The data unit 170 includes a preamble having an L-STF 172, an L-LTF 174, an L-SIG 176, a first very high throughput signal field (VHT-SIG-A) 178, a very high throughput short training field (VHT-STF) 180, M very high throughput long training fields (VHT-LTFs) 182-1 through 182-M, where M is an integer, and a second very high throughput signal field (VHT-SIG-B) 184. The data unit 170 also includes a very high throughput data portion (VHT-DATA) 186. In some embodiments, the data unit 170 is a multi-user data unit transmitted by an AP (e.g., AP 14 of FIG. 1) which carries information to more than one client station (e.g., one or more of the client stations 25 of FIG. 1) simultaneously. In such embodiments or scenarios, VHT-SIG-A 178 includes information common to all of the intended client stations, and VHT-SIG-B 184 includes user-specific information for each of the intended client stations.

Within the data unit 170, L-SIG 176 and VHT-SIG-A 178 are modulated according to BPSK, while VHT-SIG-B 184 is modulated according to Q-BPSK. Similar to the IEEE 802.11n auto-detection feature discussed above, such modulation allows a receiving device to determine or auto-detect, without decoding the entire preamble, that the data unit 170 conforms to the IEEE802.11ac Standard rather than the IEEE 802.11a Standard.

Figure 6:
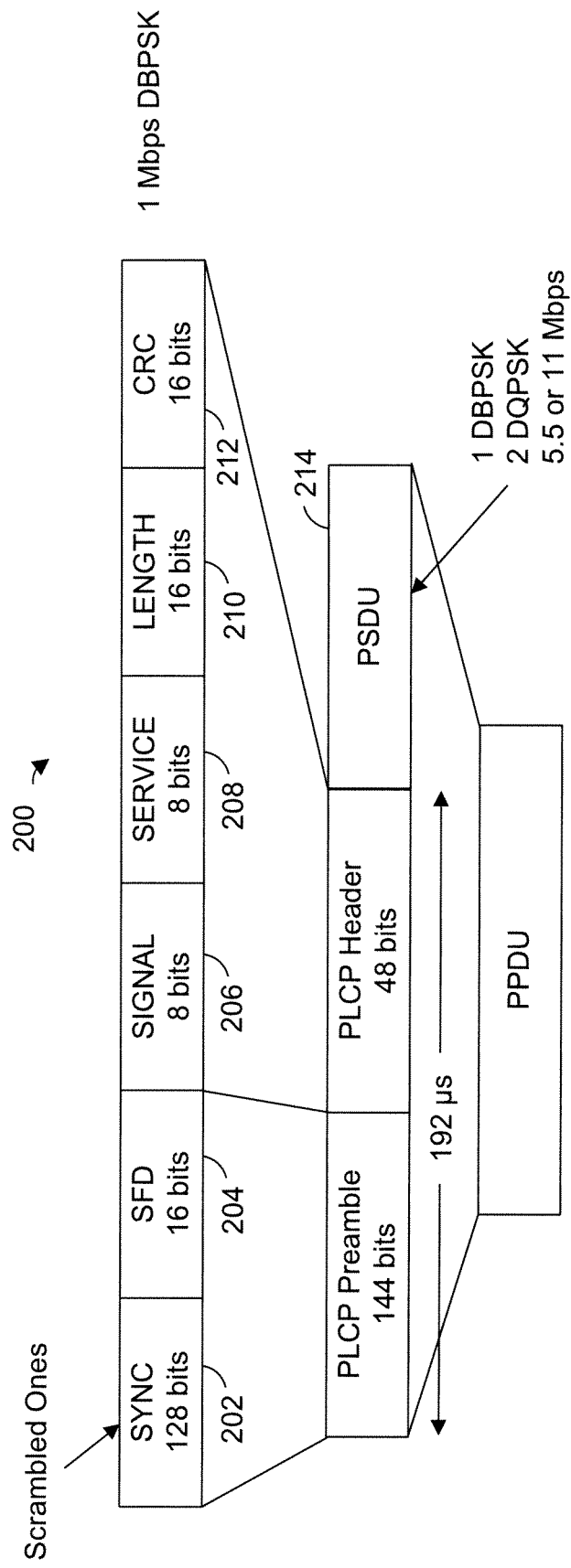
FIG. 6 is a diagram of a prior art single carrier (SC) short range data unit that an AP and/or client station is configured to transmit via a communication channel, according to an embodiment.

FIG. 6 is a diagram of a prior art single carrier (SC) short range data unit 200 that an AP (e.g., AP 14 of FIG. 1) and/or a client station (e.g., client station 25-1 of FIG. 1) is configured to transmit via a communication channel, according to another embodiment. The data unit 200 conforms to the IEEE 802.11b Standard, and is modulated by direct sequence spread spectrum (DSSS) or complementary code keying (CCK), in various embodiments. The data unit 200 includes a synchronization (SYNC) field 202 that allows a receiver to detect the presence of the data unit 200 and begin synchronizing with the incoming signal. The data unit 200 also includes a start frame delimiter (SFD) field 204 that signals the beginning of a frame. SYNC field 202 and SFD field 204 form the preamble portion of the data unit 200. The data unit 200 also includes a header portion containing a signal field 206, a service field 808, a length field 210, and a cyclic check redundancy check (CRC) field 212. The data unit 200 also includes a PHY service data unit (PSDU) 214, i.e., the data portion.

In various embodiments and/or scenarios, data units that conform to a long range communication protocol (e.g., the IEEE 802.11af or 802.11ah Standard) are formatted at least substantially the same as defined by the IEEE 802.11a Standard, the 802.11n Standard (mixed mode or Greenfield), or the 802.11ac Standard, as described and shown above in connection with FIGS. 2-5, but are transmitted at a lower frequency (e.g., sub-1 GHz) and using a slower clock rate. In some such embodiments, a transmitting device (e.g., the AP 14) down-clocks by a factor of N the clock rate used for generating the short range data units, to a lower clock rate to be used for generating the long range data units. The long range data unit is therefore generally transmitted over a longer time, and optionally occupies a smaller bandwidth, than the corresponding short range data unit. The down-clocking factor N is different according to different embodiments and/or scenarios. In one embodiment, the down-clocking factor N is equal to 10. In other embodiments, other suitable down-clocking factor (N) values are utilized, and transmission times and bandwidths of long range data units are scaled accordingly. In some embodiments, the down-clocking factor N is a power of two (e.g., N=8, 16, 32, etc.).

Examples of long range data units generated by down-clocking are described in U.S. patent application Ser. No. 13/359,336, filed Jan. 26, 2012, which is hereby incorporated by reference herein in its entirety. In some embodiments, and also as described in U.S. patent application Ser. No. 13/359,336, a long range communication protocol defines both "regular" mode data units that are down-clocked by a value $N_1$ and "extended range" data units that are down-clocked by a value $N_2$, where $N_2 > N_1$. Thus, in some embodiments, a device (e.g., the AP 14 and/or a client station 25) selectively transmits a long range data unit at a first down-clocked rate or at a second, further down-clocked rate, depending on whether the device is in regular mode or extended range mode.

Due to the use of multiple clock rates to generate coexisting data units (e.g., short range and long range data units, and/or regular long range and extended long range data units) in a particular region, it is helpful if a communication device (e.g., the AP 14 and/or a client station 25) receiving a data unit can determine or auto-detect the clock rate used to generate the data unit. As described in embodiments below, a first preamble portion of a data unit permits a receiving device to use a corresponding technique to auto-detect the clock rate of the data unit (e.g., to auto-detect the clock rate of the OFDM-modulated portion of the data unit that follows the first preamble portion). In the subsequently described embodiments, the OFDM-modulated portion of the data unit for which a clock rate is being detected is referred to as the "OFDM portion". In some embodiments (e.g., in some embodiments where the first preamble portion includes an STF), however, the first preamble portion is also OFDM-modulated.

Figure 7:
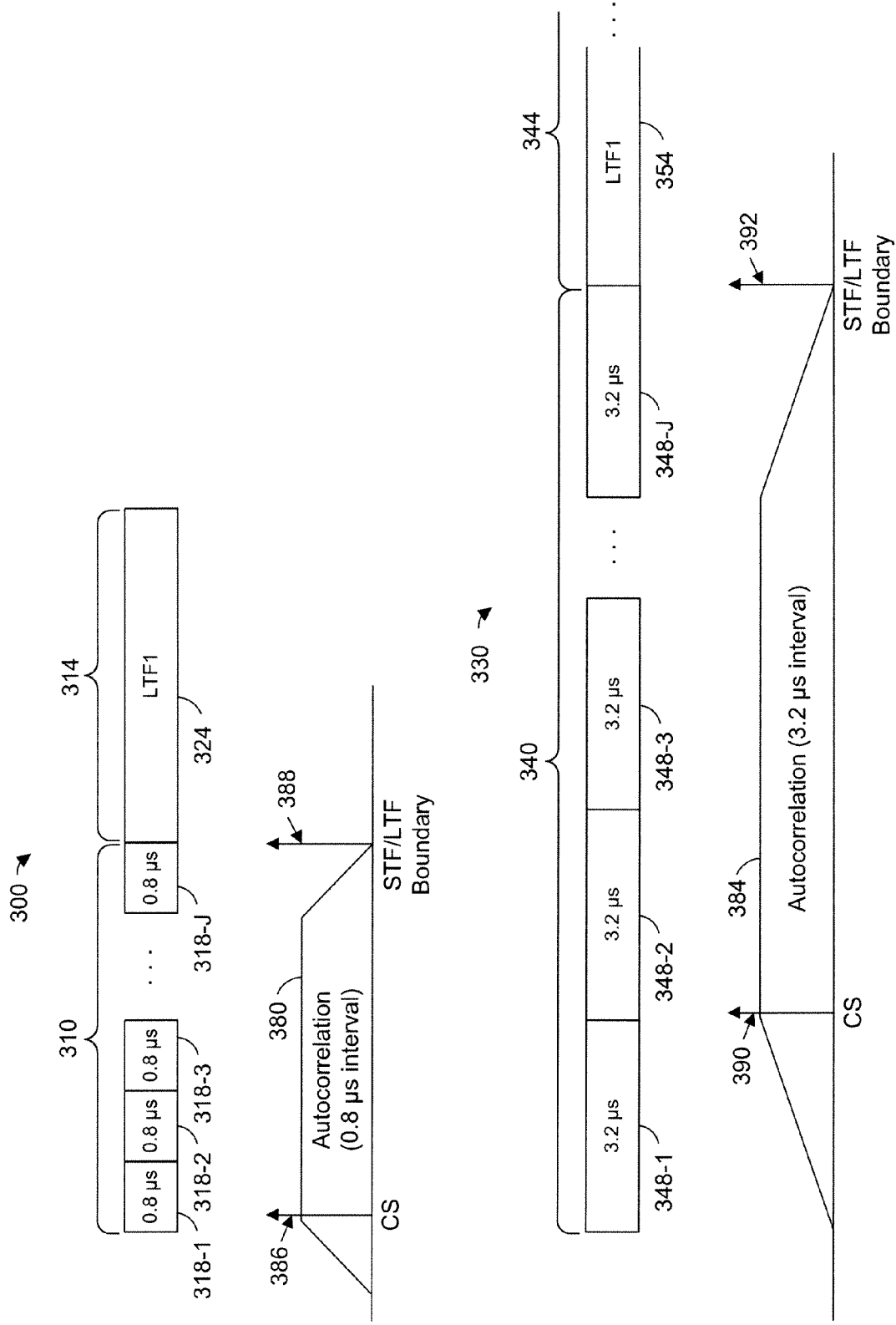
FIG. 7 is a diagram of a first example preamble design and corresponding auto-detection technique for determining a data unit clock rate, according to an embodiment.
Figure 8:
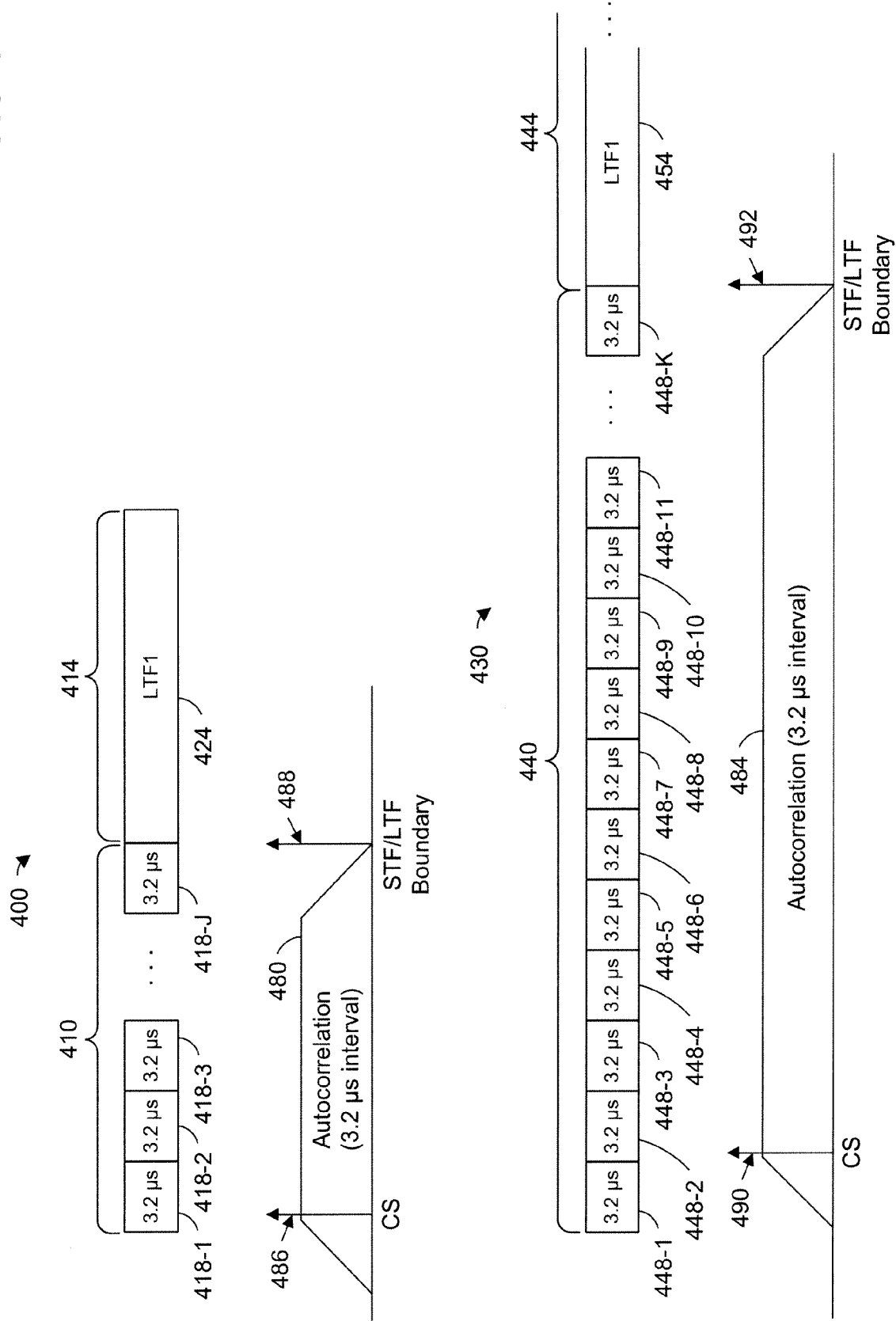
FIG. 8 is a diagram of a second example preamble design and corresponding auto-detection technique for determining a data unit clock rate, according to an embodiment.
Figure 9:
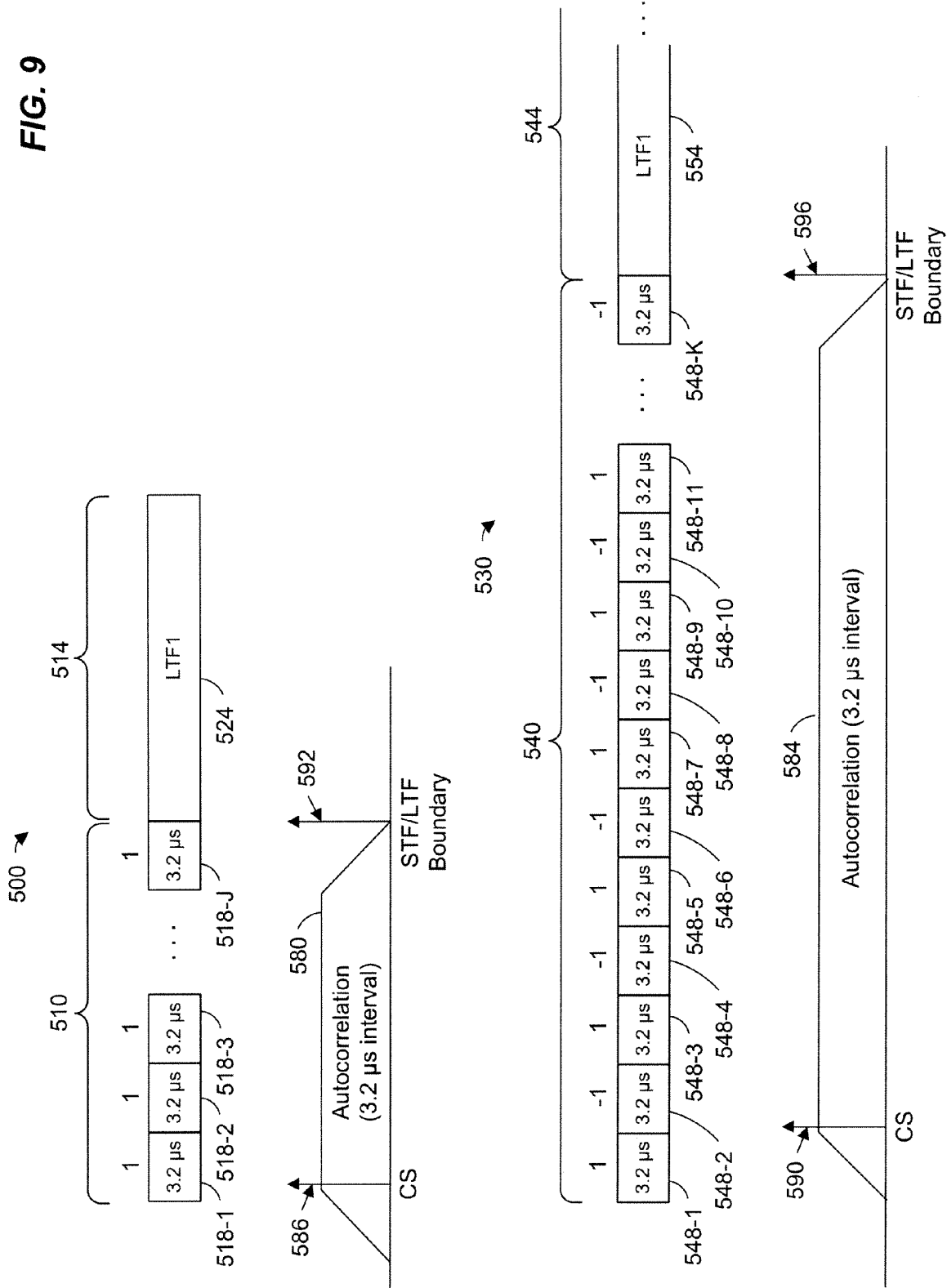
FIG. 9 is a diagram of a third example preamble design and corresponding auto-detection technique for determining a data unit clock rate, according to an embodiment.

In a first group of example embodiments, comprising a first, second, and third example embodiment and corresponding to FIGS. 7-9, an STF of the preamble of a data unit is designed to indicate the clock rate of the OFDM portion of the data unit. The STF is used for one or more of packet detection, initial synchronization, automatic gain control, etc., in various embodiments. The OFDM portion includes one or more LTFs, which in various embodiments are used for one or more of channel estimation, fine synchronization, etc. The preamble designs of FIGS. 7-9 are utilized in data units transmitted and/or received over a communication channel by a communication device (e.g., the AP 14 and/or a client station 25 of FIG. 1), in various embodiments or scenarios. Each of FIGS. 7-9 illustrates two example preambles, each reflecting a PHY mode that corresponds to a particular clock rate. In one embodiment, an AP (e.g., AP 14) is capable of generating both example preambles (i.e., the AP supports multiple PHY modes corresponding to different clock rates), while each client station (e.g., each of client stations 25) is only capable of generating one of the example preambles (i.e., each client station only supports a PHY mode corresponding to a single clock rate). In another embodiment, both the AP and one or more of the client stations are capable of generating both example preambles.

For ease of explanation, FIGS. 7-9 show preambles that include only a first portion having a single STF and a second portion having a single LTF. In other embodiments, however, different types and/or numbers of fields are included in the preamble. For example, in an embodiment, the preamble includes multiple LTFs following the STF. As another example, in an embodiment, additional, non-LTF fields of the preamble (e.g., one or more SIG fields used for signaling basic PHY parameters to the receiver) follow the LTF. In some embodiments, the preambles are the same as any one of the preambles discussed above in connection with FIGS. 2-5, but with the first STF being designed as in one of the embodiments described below in connection with FIGS. 7-9. For example, in various embodiments, L-STF 102 of FIG. 2, L-STF 122 of FIG. 3, HT-GF-STF 142 of FIG. 4, or L-STF 172 of FIG. 5 is designed according to an embodiment described below. Moreover, while FIGS. 7-9 each show preambles corresponding to only two possible clock rates, one of ordinary skill in the art will understand that the preamble designs and auto-detection techniques described below can be extended to systems including three or more coexisting PHY modes with different clock rates.

In the first example embodiment (discussed with respect to FIG. 7), an STF of the preamble is down-clocked using the same down-clocking ratio as a subsequent OFDM portion of the data unit. Referring to FIG. 7, a first preamble 300 is included in data units that have an OFDM portion clocked at a first clock rate (e.g., the normal clock rate of an IEEE 802.11a, 802.11n, or 802.11ac data unit, in an embodiment). The preamble 300 includes a first preamble portion 310 and a second preamble portion 314. The first preamble portion 310 is clocked at a first clock rate and includes J repeating STF sequences 318-1 through 318-J. The second preamble portion 314 includes at least a first long training field (LTF 1) 324, and is included in the OFDM portion of the data unit. In some embodiments, the OFDM portion of the data unit also includes a data portion (not shown in FIG. 7).

A second preamble 330 is included in data units that have an OFDM portion clocked at a second clock rate lower than the first clock rate. In the example embodiment of FIG. 7, the OFDM portion of a data unit with preamble 330 is clocked at a rate equal to ¼ the clock rate of the OFDM portion of the data unit with preamble 300 (e.g., generated by down-clocking from the first clock rate using N=4, in an embodiment). In other embodiments, the second clock rate differs from the first clock rate by a different ratio (e.g., a down-clocking ratio of N=8, 10, 16, etc. is used, in various embodiments). Similar to the preamble 300, the preamble 330 includes a first preamble portion 340 and a second preamble portion 344, with the first preamble portion 340 including J repeating STF sequences 348-1 through 348-J. Also similar to the preamble 300, the second preamble portion 344 includes at least a first long training field (LTF1) 354, and is included in the OFDM portion of the data unit. Unlike the first preamble portion 310 of preamble 300, however, the first preamble portion 340 of preamble 330 is clocked at the lower, second clock rate.

Because the STF sequences 348 are generated using a clock rate four times slower than the clock rate used to generate STF sequences 318, and because the first preamble portion 310 and the first preamble portion 340 include the same number (J) of repeating STF sequences, the first preamble portion 340 of preamble 330 is four times longer in duration than the first preamble portion 310 of preamble 300. A communication device receiving data units having preamble 300 and data units having preamble 330 can therefore take advantage of the length between the start of the first preamble portion and the end of the first preamble portion (i.e., in the embodiment of FIG. 7, between the start of the first preamble portion and the STF/LTF boundary) to determine the clock rate of the OFDM portion before demodulating OFDM symbols within the OFDM portion. To this end, and as shown in FIG. 7, a receiver performs autocorrelations on each received data unit. In one embodiment, a first autocorrelation is performed using a repetition period (time interval) corresponding to a first potential clock rate, and a second autocorrelation is performed using a repetition period corresponding to a second potential clock rate. In the example embodiment of FIG. 7, the first autocorrelation utilizes a 0.8 µs interval corresponding to the 0.8 µs length of the STF sequences 318 clocked at the first clock rate, and the second autocorrelation utilizes a 3.2 µs interval corresponding to the 3.2 µs length of the STF sequences 348 clocked at the second clock rate. The first and the second autocorrelation are simultaneously performed by parallel carrier sense circuits and/or software modules of a PHY unit such as PHY unit 20 or PHY unit 29 of FIG. 1, in an embodiment.

As shown in FIG. 7, the first autocorrelation outputs a first carrier sense signal 380, and the second autocorrelation outputs a second carrier sense signal 384. In some embodiments, the pulse length of the first carrier sense signal 380 corresponds to an estimation of a length of time between sensing a carrier (depicted as the event CS 386) and detecting a transition from the first preamble portion 310 to the second preamble portion 314 (depicted as the event "STF/LTF Boundary" 388). Similarly, in some embodiments, the pulse length of the second carrier sense signal 384 corresponds to an estimation of a length of time between sensing a carrier (depicted as the event CS 390) and detecting a transition from the first preamble portion 340 to the second preamble portion 344 (depicted as the event "STF/LTF Boundary" 392).

In some embodiments, the carrier sense signal 380 and/or the carrier sense signal 384 is/are compared to a suitable predetermined threshold, and is/are determined to be "high" when meeting the threshold. In some embodiments, detecting CS 386 or CS 390 includes determining that such a threshold is met. Moreover, in some embodiments, a transition from the first preamble portion to the second preamble portion is detected when an autocorrelation goes below such a threshold (or below a different, second threshold) after having been "high" for a time period. In some embodiments, detecting STF/LTF Boundary 388 or STF/LTF Boundary 392 includes detecting such a transition. Although FIG. 7 represents the first carrier sense signal 380 and the second carrier sense signal 384 as continuous pulses, the term "pulse" as used herein includes both continuous and non-continuous pulses (e.g., signals that are not necessarily "high." or "low" for the entire pulse length, but meet some suitable predetermined criteria for the entire pulse length).

In some embodiments, a receiver detects the clock rate of a received data unit by determining which carrier sense signal indicates a strong autocorrelation when operating on the STF portion. For example, if the second carrier sense signal 384 rises but the first carrier sense signal 380 does not rise, the receiver determines that the received STF sequences (and therefore, the corresponding OFDM portion of the data unit) are clocked at the lower, second clock rate, in an embodiment. Conversely, in this embodiment, if the first carrier sense signal 380 rises but the second carrier sense signal 384 does not rise, the receiver determines that the received STF sequences (and therefore, the corresponding OFDM portion of the data unit) are clocked at the higher, first clock rate. In other words, as an example, if the second carrier sense signal 384 meets suitable detection criteria but the first carrier sense signal 380 does not meet suitable detection criteria, the receiver determines that the received STF sequences (and therefore, the corresponding OFDM portion of the data unit) are clocked at the lower, second clock rate, in an embodiment. Conversely, in this embodiment, if the first carrier sense signal 380 meets suitable detection criteria but the second carrier sense signal 384 does not meet suitable detection criteria, the receiver determines that the received STF sequences (and therefore, the corresponding OFDM portion of the data unit) are clocked at the higher, first clock rate.

In some instances, however, an STF sequence clocked at a higher rate can trigger carrier sensing corresponding to a lower clocked rate. For example, a received data unit with STF sequences 318 (clocked at the higher, first clocked rate) can cause both the first carrier sense signal 380 and the second carrier sense signal 384 to indicate detection of a carrier, in some embodiments and/or scenarios. In this situation, the receiver determines the clock rate of the OFDM portion of the data unit based on a pulse length of at least one of the carrier sense signals 380, 384, in an embodiment. For example, in one embodiment where each STF includes J=10 sequences (e.g., the first preamble portion 310 of FIG. 7 is 8.0 μs long and the second preamble portion 340 of FIG. 7 is 32 μs long), the receiver determines that the clock rate of the OFDM portion is the first clock rate when the carrier sense signals 380, 384 indicate an 8.0 μs length between a start of carrier detection and the STF/LTF boundary, and determines that the clock rate of the OFDM portion is the second clock rate when the carrier sense signals 380, 384 indicate a 32 is length between a start of carrier detection and the STF/LTF boundary. Various other embodiments use other algorithms. As one example, where J=10, a receiver determines that the clock rate is the first clock rate when the STF/LTF boundary occurs within 10 is of the start of carrier detection, and determines that the clock rate is the second clock rate when the STF/LTF boundary occurs more than 10 μs after the start of carrier detection, in an embodiment. In some embodiments and scenarios where both the carrier sense signal 380 and the carrier sense signal 384 indicate detection of a carrier, the receiver determines the clock rate by observing the pulse length of only one of the carrier sense signals. In other embodiments, the respective pulse lengths of both carrier sense signals are observed.

Because both carrier sense signals 380, 384 may initially indicate a carrier sense, a receiver using the example auto-detection technique of FIG. 7 may not be able to determine the clock rate of a received data unit until a time well after the beginning of the first preamble portion, and therefore may not have enough time to dynamically adjust the receiver clock rate based on the detected clock rate. Accordingly, a receiver employing the auto-detection technique of FIG. 7 operates at a clock rate corresponding to the faster of the first and the second clock rates, in an embodiment.

In the second example embodiment (discussed with respect to FIG. 8), an STF of the preamble includes repeated STF sequences that are generated using a constant clock rate, regardless of the clock rate of the subsequent OFDM portion of the data unit. The STF, however, provides an indication of the clock rate of the OFDM portion by including more or fewer repetitions of the STF sequence. Referring to FIG. 8, a first preamble 400 is included in data units that have an OFDM portion clocked at a first clock rate (e.g., the normal clock rate of an IEEE 802.11a, 802.11n, or 802.11ac data unit). The preamble 400 includes a first preamble portion 410 and a second preamble portion 414. The first preamble portion 410 includes J repeating STF sequences 418-1 through 418-J. The second preamble portion 414 includes at least a first long training field (LTF1) 424, and is included in the OFDM portion of the data unit. In some embodiments, the OFDM portion of the data unit also includes a data portion (not shown in FIG. 8).

A second preamble 430 is included in data units that have an OFDM portion clocked at a second clock rate lower than the first clock rate. For example, in an embodiment, the OFDM portion of a data unit with preamble 430 is clocked at a rate equal to ¼ the clock rate of the OFDM portion of the data unit with preamble 400 (e.g., generated by down-clocking from the first clock rate using N=4, in an embodiment). In other embodiments, the second clock rate differs from the first clock rate by a different ratio (e.g., a down-clocking ratio of N=8, 10, 16, etc. is used, in various embodiments). Similar to the preamble 400, the preamble 430 includes a first preamble portion 440 and a second preamble portion 444, with the second preamble portion 444 including at least a first long training field (LTF1) 454 and being included in the OFDM portion of the data unit. Moreover, in an embodiment, the first preamble portion 440 of preamble 430 is clocked at the same clock rate as the first preamble portion 410 of preamble 400 (e.g., both being clocked at the first clock rate, or both being clocked at the second clock rate, according to various embodiments). Unlike the first preamble portion 410, however, the first preamble portion 440 includes K repeating STF sequences 448-1 through 448-K, where K is greater than J. In some embodiments, the ratio K/J is equal to the ratio of the first clock rate to the second clock rate. For example, in one embodiment where the first clock rate is four times greater than the second clock rate, the ratio K/J=4. In other embodiments, the ratio K/J is different than the ratio of the first clock rate to the second clock rate.

Because the first preamble portion 440 of preamble 430 includes more STF sequences than the first preamble portion 410 of preamble 400, the first preamble portion 440 is longer than the first preamble portion 410. A communication device receiving data units having preamble 400 and data units having preamble 430 can therefore take advantage of the length between the start of the first preamble portion and the end of the first preamble portion (i.e., in the embodiment of FIG. 8, between the start of the first preamble portion and the STF/LTF boundary) to determine the clock rate of the OFDM portion before demodulating OFDM symbols within the OFDM portion. To this end, and as shown in FIG. 8, a receiver performs an autocorrelation on each received data unit. Unlike the first example embodiment of FIG. 7, only one autocorrelation is performed on a received data unit, in an embodiment. In one embodiment, the autocorrelation is performed using a repetition period (time interval) corresponding to the clock rate used to generate both first preamble portion 410 and first preamble portion 440. In the example embodiment of FIG. 8, the autocorrelation utilizes a 3.2 μs interval corresponding to the 3.2 μs length of the STF sequences 418 and the STF sequences 448.

Whereas FIG. 7 illustrates alternative autocorrelation outputs that correspond to outputs of different (e.g., parallel) carrier sense circuits and/or software modules, both autocorrelation outputs shown in FIG. 8 represent alternative outputs of the same carrier sense circuit and/or software module. A first carrier sense signal 480 is output by the autocorrelation when a data unit with preamble 400 is received, and a second carrier sense signal 484 is output by the autocorrelation when a data unit with preamble 430 is received. In some embodiments, the pulse length of the first carrier sense signal 480 corresponds to an estimation of a length of time between sensing a carrier (depicted as the event CS 486) and detecting a transition from the first preamble portion 410 to the second preamble portion 414 (depicted as the event "STF/LTF Boundary" 488). Similarly, in some embodiments, the pulse length of the second carrier sense signal 484 corresponds to an estimation of a length of time between sensing a carrier (depicted as the event CS 490) and detecting a transition from the first preamble portion 440 to the second preamble portion 444 (depicted as the event "STF/LTF Boundary" 492).

In some embodiments, a receiver determines the clock rate of the OFDM portion of a received data unit based on a pulse length of the carrier sense signal. For example, in one embodiment where J=4 and K=16 (e.g., the first preamble portion 410 in the example embodiment of FIG. 8 is 12.8 μs long and the second preamble portion 440 of FIG. 8 is 51.2 μs long), the receiver determines that the clock rate of the OFDM portion is the first clock rate when the carrier sense signal indicates a 12.8 μs length between a carrier sense and the STF/LTF boundary, and determines that the clock rate of the OFDM portion is the second clock rate when the carrier sense signal indicates a 51.2 μs length between a carrier sense and the STF/LTF boundary. Various other embodiments use other algorithms. As one example, again where J=4 and K=16, a receiver determines that the clock rate is the first clock rate when the STF/LTF boundary occurs within 20 μs of the carrier sense, and determines that the clock rate is the second clock rate when the STF/LTF boundary occurs more than 20 μs after the carrier sense, in an embodiment. In other embodiments, different suitable values of J and K are utilized.

As with the example auto-detection technique of FIG. 7, the example auto-detection technique of FIG. 8 may not provide enough time to dynamically adjust the receiver clock rate based on the detected clock rate. Accordingly, a receiver employing the auto-detection technique of FIG. 8 operates at a clock rate corresponding to the faster of the first and the second clock rates, in an embodiment.

In the third example embodiment (discussed with respect to FIG. 9), an STF of the preamble includes repeated STF sequences that are generated using a constant clock rate, regardless of the clock rate of the subsequent OFDM portion of the data unit. A repeated STF sequence, however, is augmented by a cover code that provides an indication of the clock rate of the OFDM portion. In one embodiment, this preamble design is combined with the preamble design of FIG. 8, where the clock rate of the OFDM portion is additionally indicated by the number of repetitions of the STF sequence. FIG. 9 illustrates an example preamble design and corresponding auto-detection technique for an embodiment where both a cover code and the number of STF sequences are used to indicate the clock rate of the OFDM portion. Referring to FIG. 9, a first preamble 500 is included in data units that have an OFDM portion clocked at a first clock rate (e.g., the normal clock rate of an IEEE 802.11a, 802.11n, or 802.11ac data unit, in various embodiments). The preamble 500 includes a first preamble portion 510 and a second preamble portion 514. The first preamble portion 510 includes J repeating STF sequences 518-1 through 518J that are augmented by a first cover code. The first cover code corresponds to the first clock rate (i.e., is used to indicate to a receiving device that the first clock rate is used for the OFDM portion of the data unit). The second preamble portion 514 includes at least a first long training field (LTF1) 524, and is included in the OFDM portion of the data unit. In some embodiments, the OFDM portion of the data unit also includes a data portion (not shown in FIG. 9).

A second preamble 530 is included in data units that have an OFDM portion clocked at a second clock rate lower than the first clock rate. For example, in an embodiment, the OFDM portion of a data unit with preamble 530 is clocked at a rate equal to ¼ the clock rate of the OFDM portion of the data unit with preamble 500 (e.g., by down-clocking from the first clock rate using N=4, in an embodiment). In other embodiments, the second clock rate differs from the first clock rate by a different ratio (e.g., a down-clocking ratio of N=8, 10, 16, etc. is used, in various embodiments). Similar to the preamble 500, the preamble 530 includes a first preamble portion 540 and a second preamble portion 544, with the second preamble portion 544 including at least a first long training field (LTF1) 554 and being included in the OFDM portion of the data unit. Moreover, in an embodiment, the first preamble portion 540 of preamble 530 is clocked at the same clock rate as the first preamble portion 510 of preamble 500 (e.g., both being clocked at the first clock rate, or both being clocked at the second clock rate, according to various embodiments). Unlike the first preamble portion 510, however, the first preamble portion 540 includes STF sequences 548 that are augmented by a second cover code different than the first cover code. The second cover code corresponds to the lower, second clock rate (i.e., is used to indicate to a receiving device that the OFDM portion of the data unit is clocked at the second clock rate). In an embodiment, the first cover code, used in preamble 500, is a series of only positive ones (i.e., [1 1 1 1 . . . ]), while the second cover code, used in preamble 530, is a series of alternating positive and negative ones (i.e., [1 -1 1 -1 . . . ]).

As seen in FIG. 9, the first preamble portion 540 of preamble 530 includes K repeating STF sequences 548-1 through 548-K. In embodiments such as the example embodiment illustrated in FIG. 9, where the clock rate of the OFDM portion is additionally indicated by the number of STF sequences, K is greater than J. In some of these embodiments, the ratio K/J is equal to the ratio of the first clock rate to the second clock rate. Alternatively, in some embodiments where the clock rate of the OFDM portion is not indicated by the number of STF sequences, K is equal to J.

Because the cover code of the first preamble section is not known a priori for a particular received data unit, a receiver processes the first preamble portion of the received data unit in two parallel paths, in an embodiment. In a first path the receiver attempts to remove or undo the first cover code, and in a second path the receiver attempts to remove or undo the second cover code, in an embodiment. A first autocorrelation of at least the first preamble portion (as processed) follows the cover code processing in the first path, and a second, parallel autocorrelation of at least the first preamble portion (as processed) follows the cover code processing in the second path, in an embodiment. For example, in one embodiment where the first cover code is a series of positive ones and the second cover code is a series of alternating positive ones and negative ones, the first autocorrelation is a conventional autocorrelation, but the samples of one of the two windows of the second autocorrelation are multiplied by negative one.

As shown in FIG. 9, the first autocorrelation outputs a first carrier sense signal 580, and the second autocorrelation outputs a second carrier sense signal 584. In some embodiments, a receiver detects the clock rate of a received data unit by determining which carrier sense signal indicates a strong autocorrelation when operating on the STF portion. For example, if the second carrier sense signal 584 rises (i.e., carrier sense 586 occurs) but the first carrier sense signal 580 does not rise (i.e., carrier sense 590 does not occur), the receiver determines that the OFDM portion of the data unit is clocked at the lower, second clock rate, in an embodiment. Conversely, in this embodiment, if the first carrier sense signal 580 rises but the second carrier sense signal 584 does not rise, the receiver determines that the OFDM portion of the data unit is clocked at the higher, first clock rate. In some embodiments where the clock rate is additionally indicated by the number of STF sequences (i.e., where K>J), the receiver also determines, or confirms, the clock rate based on the pulse length of carrier sense signal 580 and/or carrier sense signal 584 (e.g., the position of the STF/LTF boundary 592 or the STF/LTF boundary 596), similar to the auto-detection method of FIG. 8. In other words, as an example, if the second carrier sense signal 584 meets suitable detection criteria but the first carrier sense signal 580 does not meet suitable detection criteria, the receiver determines that the corresponding OFDM portion of the data unit is clocked at the lower, second clock rate, in an embodiment. Conversely, in this embodiment, if the first carrier sense signal 580 meets suitable detection criteria but the second carrier sense signal 584 does not meet suitable detection criteria, the receiver determines that the OFDM portion of the data unit is clocked at the higher, first clock rate.

A receiver using the example auto-detection technique of FIG. 9 is generally able to quickly determine the clock rate of a received data unit (e.g., based on the carrier sense 586 or carrier sense 590). Thus, in an embodiment, the receiving device is configured to dynamically adjust the receiver clock rate to correspond to the determined clock rate of the OFDM portion, which can save power in the receiving device. In some of these embodiments, the receiving device is configured to dynamically adjust the receiver clock rate in response to the occurrence of carrier sense 586 or carrier sense 590, depending on whether a data unit with an OFDM portion clocked at the first clock rate or the second clock rate is received. In an embodiment, the receiving device is configured to dynamically adjust the receiver clock rate before processing (e.g., demodulating) any part of the OFDM portion of the data unit.

Figure 10:
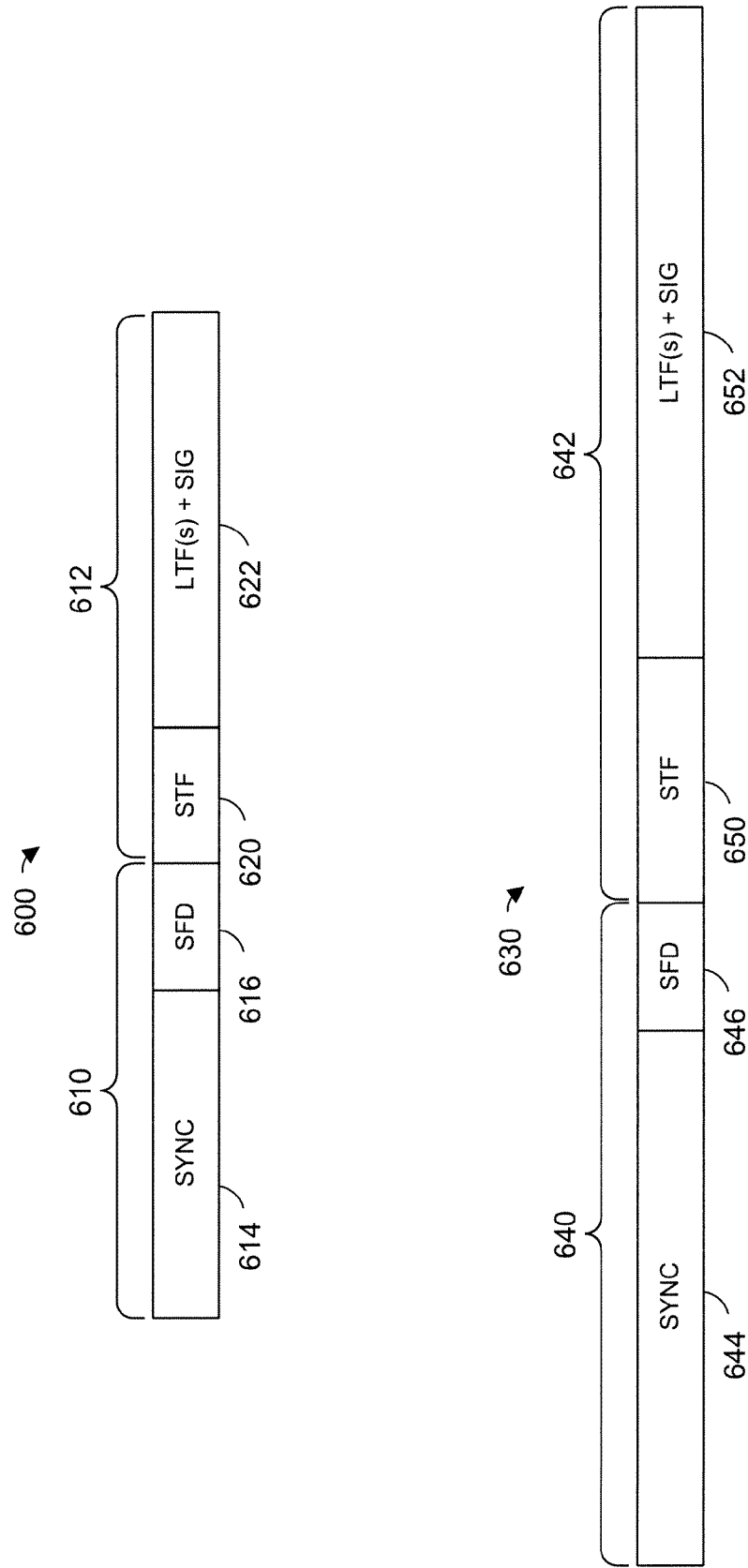
FIG. 10 is a diagram of a fourth example preamble design corresponding to an auto-detection technique for determining a data unit clock rate, according to an embodiment.
Figure 11:
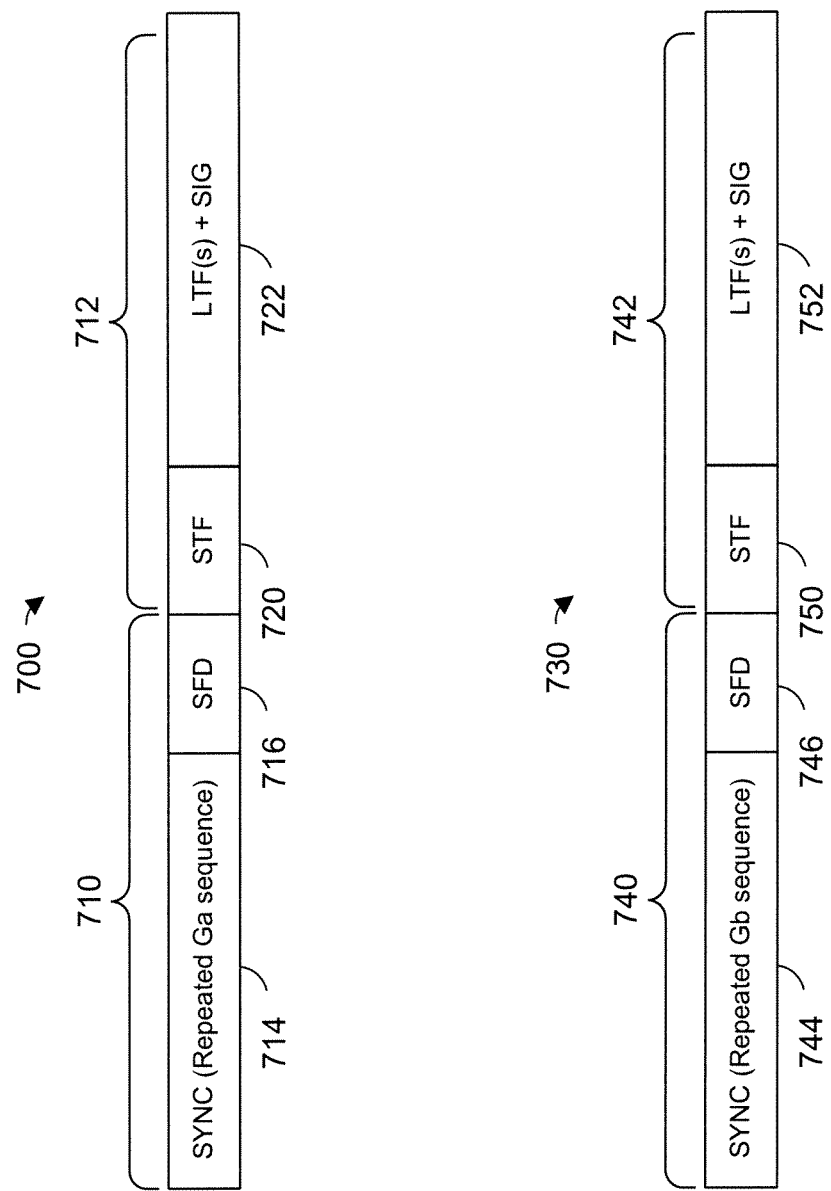
FIG. 11 is a diagram of a fifth example preamble design corresponding to an auto-detection technique for determining a data unit clock rate, according to an embodiment.
Figure 12:
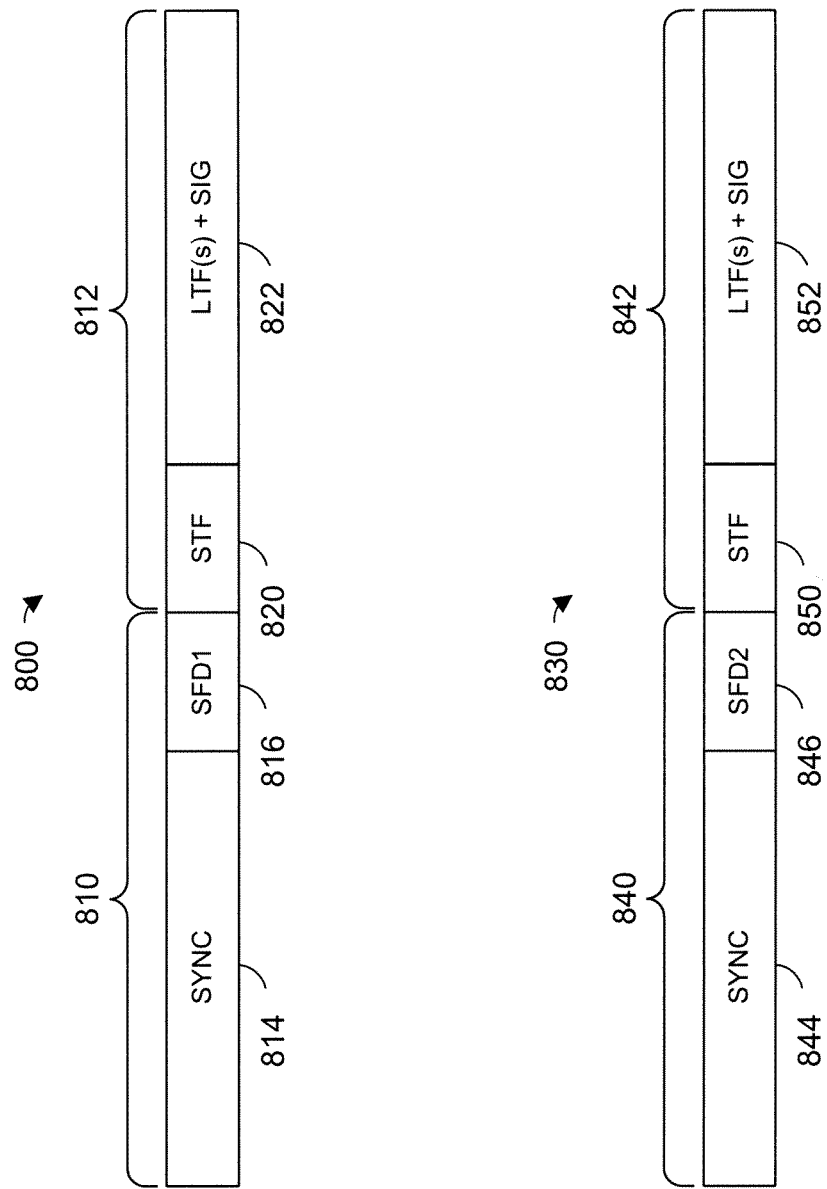
FIG. 12 is a diagram of a sixth example preamble design corresponding to an auto-detection technique for determining a data unit clock rate, according to an embodiment.

In a second group of example embodiments, comprising fourth, fifth, and sixth example embodiments, and corresponding to FIGS. 10-12, an SC "extra preamble" portion serves as a first preamble portion of a long range data unit, where the extra preamble portion is designed to reflect the clock rate of the OFDM portion of the data unit. In some embodiments, formats of the data units of FIGS. 10-12 are similar to a short range data unit, with the exception of the extra preamble portion. The extra preamble portion includes a SYNC field (e.g., similar to a SYNC field according to the IEEE 802.11b Standard) and, in some embodiments, an SFD field (e.g., similar to an SFD field according to the IEEE 802.11b Standard). In these example embodiments, the SYNC field and/or the SFD field is/are designed to reflect the clock rate of the OFDM portion of the data unit. In some embodiments where a data unit is generated for transmission via multiple, aggregated 20 MHz channels (e.g., via a 40 MHz, 80 MHz, 160 MHz, etc. channel), the extra preamble portion is repeated in each 20 MHz sub-band.

The extra preamble portion is sampled or clocked at a lower rate than the OFDM portion of the data unit, in some embodiments. For example, in one embodiment, the extra preamble portion is down-clocked from the IEEE 802.11b rate of 11 MHz by a down-clock ratio N equal to a down-clocking ratio used for the OFDM portion of the data unit. As another example, in another embodiment, the extra preamble portion is sampled or clocked with approximately ⅔ the clock rate of the regular (not down-clocked) OFDM portion. In some embodiments where the extra preamble portion is sampled or clocked at a different rate than the OFDM portion, one or more particular requirements with respect to the SC/OFDM boundary between the extra preamble portion and the OFDM portion are satisfied. For example, the SC/OFDM boundary requirement defined in the IEEE 802.11g Standard is satisfied, in an embodiment.

The preamble designs of FIGS. 10-12 are utilized in data units transmitted and/or received over a communication channel by a communication device (e.g., the AP 14 and/or a client station 25 of FIG. 1), in various embodiments or scenarios. Each of FIGS. 10-12 illustrates two example preambles, each reflecting a PHY mode that corresponds to a particular clock rate of the OFDM portion. In one embodiment, an AP (e.g., AP 14) is capable of generating both example preambles (i.e., the AP supports multiple PHY modes corresponding to different clock rates), while each client station (e.g., each of client stations 25) is only capable of generating one of the example preambles (i.e., each client station only supports a PHY mode corresponding to a single clock rate). In another embodiment, both the AP and one or more of the client stations are capable of generating both example preambles.

In some embodiments, the preambles of FIGS. 10-12 include different types and/or numbers of fields than shown. For example, in an embodiment, additional fields are included between the extra preamble portion and the STF (or, in embodiments without an STF, between the extra preamble portion and an LTF). In some embodiments, the preambles are the same as any one of the preambles discussed above in connection with FIGS. 2-5, but with one of the extra preamble portions described below in connection with FIGS. 10-12 being added at the beginning of the preamble. For example, in various embodiments, the extra preamble portion is added before L-STF 102 of FIG. 2, L-STF 122 of FIG. 3, HT-GF-STF 142 of FIG. 4, or L-STF 172 of FIG. 5. Moreover, while FIGS. 10-12 each show preambles corresponding to only two possible clock rates, one of ordinary skill in the art will understand that the preamble designs and auto-detection techniques described below can be extended to systems including three or more coexisting PHY modes with different clock rates.

In the fourth example embodiment (discussed with respect to FIG. 10), the preamble includes a SYNC field that is generated using a constant clock rate, regardless of the clock rate of the OFDM portion of the corresponding data unit. The SYNC field, however, has a particular length based on the clock rate of the OFDM portion, allowing a receiver to differentiate between clock rates based on the SYNC field. Referring to FIG. 10, a first preamble 600 is included in data units that have an OFDM portion clocked at a first clock rate (e.g., the normal clock rate of an IEEE 802.11a, 802.11n, or 802.11ac data unit, in various embodiments). The preamble 600 includes a first preamble portion 610 (i.e., the "extra preamble" portion) and a second preamble portion 612. The first preamble portion 610 includes a SYNC field 614 and an SFD field 616. In an embodiment, the first preamble portion includes a number of repetitions of a Barker code. The second preamble portion 612 is included in the OFDM portion of the data unit, and includes an STF 620 and a preamble portion 622 with one or more LTFs and a SIG field. In some embodiments, the OFDM portion of the data unit also includes a data portion (not shown in FIG. 10). In an alternative embodiment, the preamble 600 does not include SFD field 616. In another alternative embodiment, SFD field 616 is included in preamble 600 but STF 620 is not included.

A second preamble 630 is included in data units that have an OFDM portion clocked at a second clock rate lower than the first clock rate. For example, in an embodiment, the OFDM portion of a data unit with preamble 630 is clocked at a rate equal to ¼ the clock rate of the OFDM portion of the data unit with preamble 600 (e.g., by down-clocking from the first clock rate using N=4, in an embodiment). In other embodiments, the second clock rate differs from the first clock rate by a different suitable ratio (e.g., a down-clocking ratio of N=8, 10, 16, etc. is used, in various embodiments). Similar to the preamble 600, the preamble 630 includes a first preamble portion 640 and a second preamble portion 642, with the first preamble portion 640 including a SYNC field 644 and an SFD field 646. Also similar to the preamble 600, the second preamble portion 642 is included in the OFDM portion, and includes an STF 650 and a preamble portion 652 with one or more LTFs and a SIG field. Further, in an embodiment, the first preamble portion 640 of preamble 630 is clocked at the same clock rate as the first preamble portion 610 of preamble 600 (e.g., both being clocked at the first clock rate, or both being clocked at the second clock rate, according to various embodiments). SYNC field 644, however, is longer than SYNC field 614 of preamble 600. In one embodiment, SYNC field 644 includes a number of repetitions of a Barker code that is greater than a number of repetitions of the same Barker code in SYNC field 614. For example, SYNC field 644 includes a number of repetitions of a Barker code that is N times greater than the number of repetitions of the same Barker code in SYNC field 614 when the first clock rate is N times greater than the second clock rate. In some embodiments, the SFD field is also utilized to differentiate between the first and second clock rates. In these embodiments, SFD field 646 of preamble 630 is different than SFD field 616 of preamble 600.

In an embodiment, a communication device receiving data units having preamble 600 and data units having preamble 630 takes advantage of the different SYNC fields (and, in some embodiments, the different SFD fields) of preamble 600 and preamble 630 to determine the clock rate of the OFDM portion before demodulating OFDM symbols in the OFDM portion. In some embodiments, the receiver performs an autocorrelation to detect which SYNC field (and therefore, which OFDM portion clock rate) is used in the received packet.

In the fifth example embodiment (discussed with respect to FIG. 11), the preamble again includes a SYNC field that is generated using a constant clock rate, regardless of the clock rate of the OFDM portion of the corresponding data unit. The SYNC field, however, includes a particular repeated sequence based on the clock rate of the OFDM portion, allowing a receiver to differentiate between clock rates based on the SYNC field. Referring to FIG. 11, a first preamble 700 is included in data units that have an OFDM portion clocked at a first clock rate (e.g., the normal clock rate of an IEEE 802.11a, 802.11n, or 802.11ac data unit, in various embodiments). The preamble 700 includes a first preamble portion 710 (i.e., the "extra preamble" portion) and a second preamble portion 712. The first preamble portion 710 includes a SYNC field 714 and a start frame delimiter field SFD field 716. SYNC field 714 includes a first repeated sequence (Ga). In an embodiment, the first repeated sequence is a first Golay sequence. The second preamble portion 712 is included in the OFDM portion of the data unit, and includes an STF 720 and a preamble portion 722 with one or more LTFs and a SIG field. In some embodiments, the OFDM portion of the data unit also includes a data portion (not shown in FIG. 11). In an alternative embodiment, the preamble 700 does not include SFD field 716. In another alternative embodiment, SFD field 716 is included in preamble 700, but STF 720 is not included.

A second preamble 730 is included in data units that have an OFDM portion clocked at a second clock rate lower than the first clock rate. For example, in an embodiment, the OFDM portion of a data unit with preamble 730 is clocked at a rate equal to ¼ the clock rate of the OFDM portion of the data unit with preamble 700 (e.g., by down-clocking from the first clock rate using N=4, in an embodiment). In other embodiments, the second clock rate differs from the first clock rate by a different suitable ratio (e.g., a down-clocking ratio of N=8, 10, 16, etc. is used, in various embodiments). Similar to the preamble 700, the preamble 730 includes a first preamble portion 740 and a second preamble portion 742, with the first preamble portion 740 including a SYNC field 744. Also similar to the preamble 700, the second preamble portion 742 is included in the OFDM portion, and includes an STF 750 and a preamble portion 752 with one or more LTFs and a SIG field. Further, in an embodiment, the first preamble portion 740 of preamble 730 is clocked at the same clock rate as the first preamble portion 710 of preamble 700 (e.g., both being clocked at the first clock rate, or both being clocked at the second clock rate, according to various embodiments). SYNC field 744, however, includes a second repeated sequence (Gb) different than the first repeated sequence Ga. In some embodiments, the second repeated sequence is a second Golay sequence complementary to the first Golay sequence. In some embodiments, the sequences Ga and Gb are suitable complementary sequences other than Golay sequences. In an embodiment, complementary sequences Ga and Gb are selected so that the sum of corresponding out-of-phase aperiodic autocorrelation coefficients of the sequences Ga and Gb is zero. In some embodiments, complementary sequences Ga and Gb have a zero or almost-zero periodic cross-correlation. In another aspect, sequences Ga and Gb have aperiodic cross-correlation with a narrow main lobe and low-level side lobes, or aperiodic auto-correlation with a narrow main lobe and low-level side lobes.

Generally, the two complementary sequences of SYNC field 714 and SYNC field 744 have correlation properties suitable for detection at a receiving device. In embodiments where the sequences are Golay sequences, Golay sequences of length 16, 32, 64, 128, or any other suitable length are utilized for the complementary sequences. In an embodiment, pi/2 chip-level rotation is applied to the Golay code sequences in the same manner as defined in the IEEE802.11ad Standard.

The preamble 730 also includes a start frame delimiter field SFD field 746, which in some embodiments is different than SFD field 716. In an alternative embodiment, where preamble 700 does not include SFD field 716, the preamble 730 does not include SFD field 746.

In another alternative embodiment, where preamble 700 includes SFD field 716 but not STF 720, preamble 730 includes SFD field 746 but not STF 750. In an embodiment, both SFD field 716 and SFD field 746 each include one or more of the sequences (e.g., Golay sequences) repeated in the SYNC field, but augmented by a sign flip (i.e., reversed polarity, e.g., —Ga or -Gb). In another embodiment, both SFD field 716 and SFD field 746 include a sequence that is complementary to the repeated sequence of the SYNC field. For example, SFD field 746 of preamble 730 includes a first Golay sequence utilized in SYNC field 714 of preamble 700, and SFD field 716 of preamble 700 includes a second Golay sequence utilized in SYNC field 744 of preamble 730, in an embodiment.

In an embodiment, a communication device receiving data units having preamble 700 and data units having preamble 730 takes advantage of the different SYNC fields (and, in some embodiments, the different SFD fields) of preamble 700 and preamble 730 to determine the clock rate of the OFDM portion before demodulating OFDM symbols in the OFDM portion. In some embodiments, the receiver performs parallel cross-correlations, each of which correlates the received sequences with one of the possible SYNC field sequences, and compares the outputs of the cross-correlations to determine which SYNC field (and, therefore, which OFDM portion clock rate) is used in the received packet.

In the sixth example embodiment (discussed with respect to FIG. 12), the preamble includes a SYNC field that does not change based on the OFDM portion clock rate. However, the preamble includes a different SFD field for each different clock rate. Referring to FIG. 12, a first preamble 800 is included in data units that have an OFDM portion clocked at a first clock rate (e.g., the normal clock rate of an IEEE 802.11a, 802.11n, or 802.11ac data unit, in various embodiments). The preamble 800 includes a first preamble portion 810 (i.e., the "extra preamble" portion) and a second preamble portion 812. The first preamble portion 810 includes a SYNC field 814 and a first start frame delimiter (SFD1) field 816. The second preamble portion 812 is included in the OFDM portion of the data unit, and includes an STF 820 and a preamble portion 822 with one or more LTFs and a SIG field. In some embodiments, the OFDM portion of the data unit also includes a data portion (not shown in FIG. 12). In an alternative embodiment, the preamble 800 does not include STF 820.

A second preamble 830 is included in data units that have an OFDM portion clocked at a second clock rate lower than the first clock rate. For example, in an embodiment, the OFDM portion of a data unit with preamble 830 is clocked at a rate equal to ¼ the clock rate of the OFDM portion of the data unit with preamble 800 (e.g., by down-clocking from the first clock rate using N=4, in an embodiment). In other embodiments, the second clock rate differs from the first clock rate by a different suitable ratio (e.g., a down-clocking ratio of N=8, 10, 16, etc. is used, in various embodiments). Similar to the preamble 800, the preamble 830 includes a first preamble portion 840 and a second preamble portion 842, with the first preamble portion 840 including a SYNC field 844. Also similar to the preamble 800, the second preamble portion 842 is included in the OFDM portion, and includes an STF 850 and a preamble portion 852 with one or more LTFs and a SIG field. Further, in an embodiment, the first preamble portion 840 of preamble 830 is clocked at the same clock rate as the first preamble portion 810 of preamble 800 (e.g., both being clocked at the first clock rate, or both being clocked at the second clock rate, according to various embodiments). The first preamble portion 840, however, includes a second start frame delimiter (SFD2) field 846 that is different than SFD1 field 816. For example, in one embodiment, SFD1 field 816 includes one or more sequences that are repeated in SYNC field 814 but with a sign flip, while SFD2 field 846 includes the one or more sequences without the sign flip. As another example, in one embodiment, SFD1 field 816 includes one or more repetitions of a sequence that is different than a sequence repeated one or more times in SFD2 field 846.

In an embodiment, a communication device receiving data units having preamble 800 and data units having preamble 830 takes advantage of the different SFD fields of preamble 800 and preamble 830 to determine the clock rate of the OFDM portion before demodulating OFDM symbols in the OFDM portion. In some embodiments where SFD1 field 816 and SFD2 field 846 include different sequences, or where SFD2 field 846 includes the same sequence as SFD1 field 816 but with a sign flip, a receiver performs parallel cross-correlations to detect which SFD (and, therefore, which OFDM portion) is used in the received packet.

Figure 13:
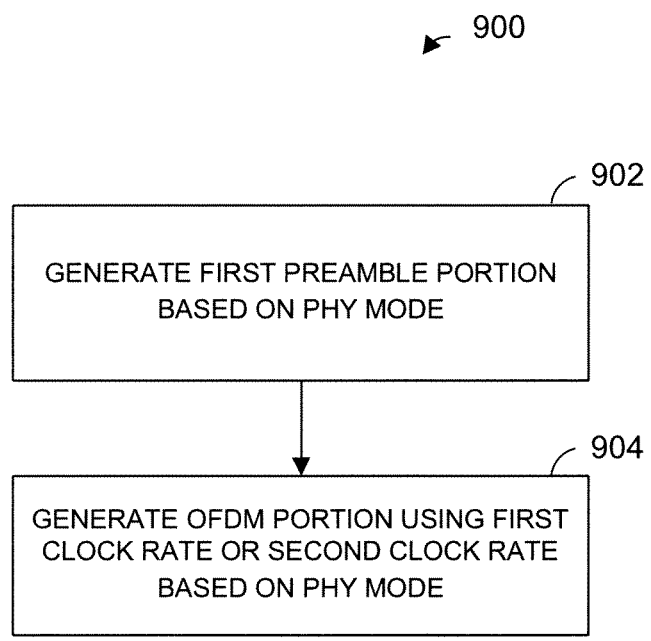
FIG. 13 is a flow diagram of an example method for generating a data unit according to the first, second, third, fourth, fifth, or sixth example preamble design, according to an embodiment.

FIG. 13 is a flow diagram of an example method 900 for generating a data unit according to the first, second, third, fourth, fifth, or sixth example preamble design (of which example embodiments are shown in FIGS. 7-12, respectively), according to an embodiment. In some embodiments, an AP such as the AP 14 of FIG. 1 (and/or a client station such as the client station 25-1) is configured to implement the method 900 to generate a data unit for transmission over a communication channel.

At block 902, a first preamble portion is generated based on a PHY mode. More specifically, the first preamble portion is generated based at least on whether the PHY mode is a first PHY mode or a second PHY mode. In an embodiment, the first and second PHY modes correspond to particular communication protocols or particular modes of a communication protocol. For example, in one embodiment, the first PHY mode corresponds to a short range communication protocol and the second PHY mode corresponds to a long range communication protocol. As another example, in an embodiment, the first PHY mode corresponds to a regular mode of a long range communication protocol and the second PHY mode corresponds to an extended range mode of the long range communication protocol. In some embodiments, the first preamble portion is generated also based on whether the PHY mode is one or more other possible PHY modes (e.g., a third PHY mode, a fourth PHY mode, etc.). For example, in an embodiment, the first PHY mode corresponds to a short range communication protocol, the second PHY mode corresponds to a regular mode of a long range communication protocol, and a third PHY mode corresponds to an extended range mode of the long range communication protocol.

In some embodiments, the first preamble portion is OFDM-modulated. For example, in an embodiment, the first preamble portion includes an OFDM-modulated STF. In other embodiments, the first preamble portion uses SC modulation. For example, in an embodiment, the first preamble portion includes an SC SYNC field. More specific examples of first preamble portions that are based on the PHY mode are described below in connection with FIGS. 15, 17, 19, 21, and 23.

At block 904, an OFDM portion is generated using a first clock rate or a second clock rate based on the PHY mode. More specifically, the OFDM portion is clocked at the first clock rate when the PHY mode is the first PHY mode, and is clocked at the second clock rate when the PHY mode is the second PHY mode. The second clock rate is lower than the first clock rate (e.g., in some embodiments, by an integer factor N). The OFDM portion follows the first preamble portion in the data unit being generated, and includes a second preamble portion that includes one or more LTFs. In some embodiments, the OFDM portion also includes a data portion of the data unit. In some embodiments, the OFDM portion is the same as a corresponding portion of a short range data unit or long range data unit as described in connection with FIGS. 2-5. In some of these embodiments, the design of the OFDM portion is based on the PHY mode.

Although FIG. 13 shows only blocks 902 and 904 in the method 900, some embodiments include additional method elements. For example, in an embodiment, a third method element after block 904 includes transmitting via a communication channel (e.g., a wireless communication channel) a data unit that includes the generated first preamble portion and the generated OFDM portion. Moreover, although block 904 is shown later in the flow diagram of example method 900 than block 902, block 904 occurs before, or simultaneously with, block 902 in other embodiments.

Figure 14:
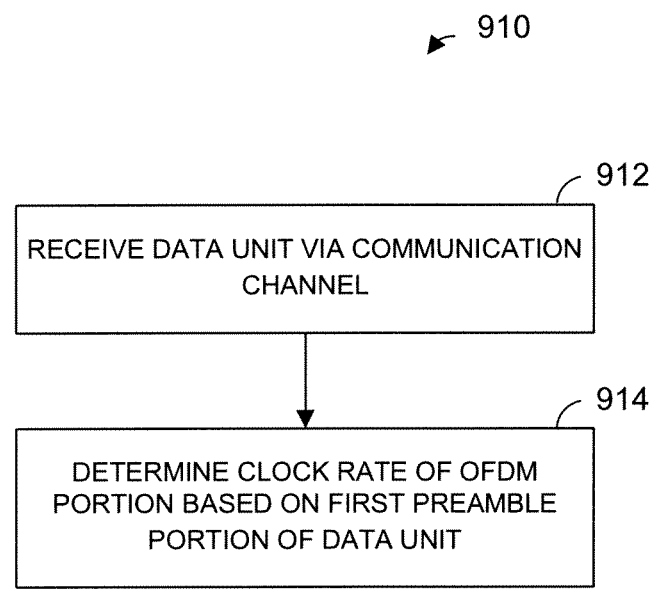
FIG. 14 is a flow diagram of an example method for auto-detecting a clock rate of a data unit generated according to the first, second, third, fourth, fifth, or sixth example preamble design, according to an embodiment.

FIG. 14 is a flow diagram of an example method 910 for auto-detecting a clock rate of a data unit generated according to the first, second, third, fourth, fifth, or sixth example preamble design (of which example embodiments are shown in FIGS. 7-12, respectively), according to an embodiment. In some embodiments, an AP such as the AP 14 of FIG. 1 (and/or a client station such as the client station 25-1) is configured to implement the method 910.

At block 912, a data unit is received via a communication channel. In an embodiment where the method 910 is implemented by an AP such as AP 14 of FIG. 1, the data unit is received via an antenna such as one or more of antennas 24 of FIG. 1 and a PHY unit such as PHY unit 20 of FIG. 1. In an embodiment where the method 910 is implemented by a client station such as client station 25-1 of FIG. 1, the data unit is received via an antenna such as one or more of antennas 34 of FIG. 1 and a PHY unit such as PHY unit 29 of FIG. 1. In an embodiment, the communication channel is a wireless communication channel.

The data unit received at block 912 includes a first preamble portion, and an OFDM portion that follows the first preamble portion. The OFDM portion of the data unit includes a second preamble portion including one or more LTFs. According to various embodiments, the received data unit is a data unit having the preamble design described in connection with any one of FIGS. 7-12. Additionally or alternatively, according to various embodiments, the received data unit is a data unit generated according to the method of any one of FIG. 15, 17, 19, 21, or 23, described below.

At block 914, a clock rate of the OFDM portion of the data unit received at block 912 is auto-detected or determined based on the first preamble portion of the data unit. More specifically, it is determined whether the clock rate is a first clock rate corresponding to a first PHY mode or a lower, second clock rate corresponding to a second PHY mode, in an embodiment. In various embodiments, the PHY modes are similar to any of the PHY modes described in connection with block 902 of method 900 in FIG. 13. More specific examples of how the clock rate of the OFDM portion is determined are described below in connection with FIGS. 16, 18, 20, 22, and 24.

Although FIG. 14 shows only blocks 912 and 914 in the method 910, some embodiments include additional method elements. Moreover, while the method 910 has been described with reference to determining a first or a second clock rate, some embodiments additionally determine (at block 914) whether the clock rate is a third clock rate, a third or a fourth clock rate, etc.

Figure 15:
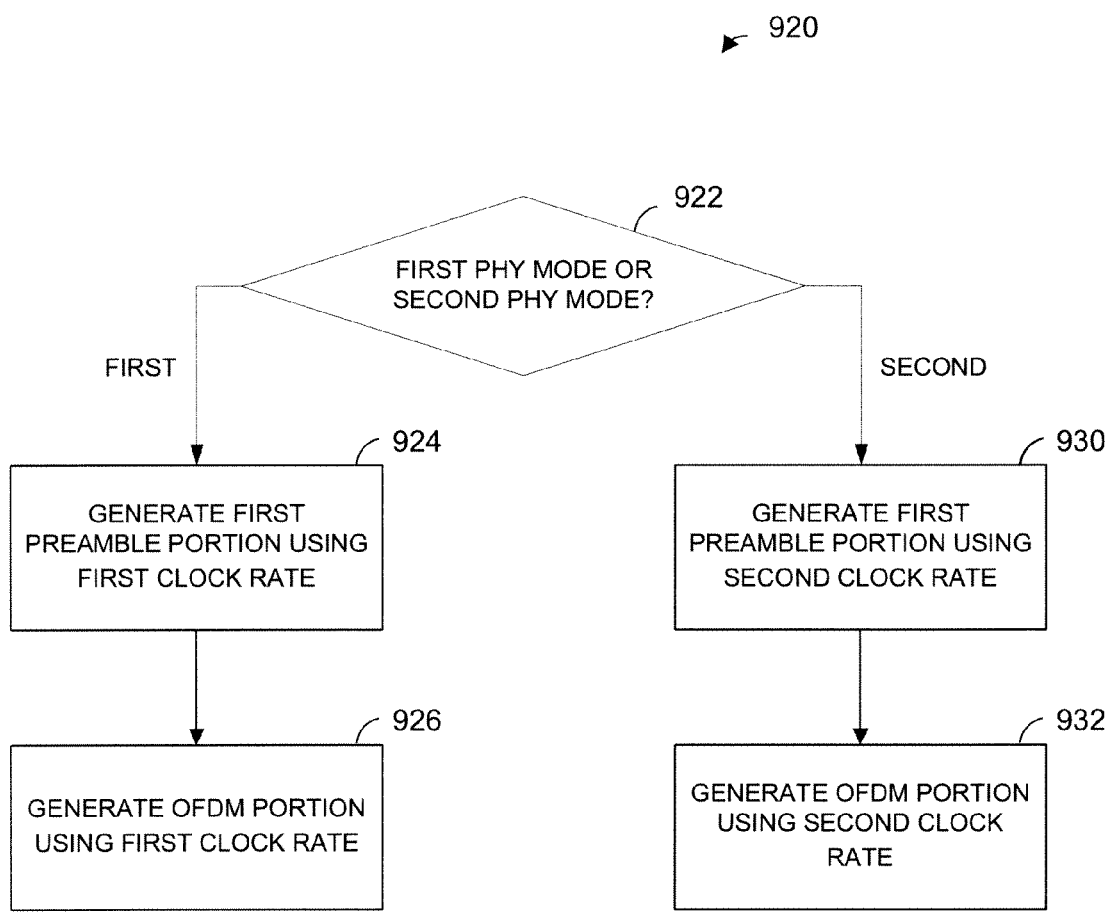
FIG. 15 is a flow diagram of an example method for generating a data unit according to the first example preamble design, according to an embodiment.

FIG. 15 is a flow diagram of an example method 920 for generating a data unit according to the first example preamble design (of which an example embodiment is shown in FIG. 7), according to an embodiment. In some embodiments, an AP such as the AP 14 of FIG. 1 (and/or a client station such as the client station 25-1) is configured to implement the method 920 to generate a data unit for transmission over a communication channel.

At block 922, it is determined whether a PHY mode of a communication device implementing the method 920 is a first PHY mode or a second PHY mode. In an embodiment, the first and second PHY modes correspond to particular communication protocols or particular modes of a communication protocol, such as described above in connection with block 902 of method 900 in FIG. 13.

If it is determined at block 922 that the PHY mode is the first PHY mode, the flow proceeds to block 924. At block 924, a first preamble portion is generated using a first clock rate that corresponds to the first PHY mode. In various embodiments, the first preamble portion is OFDM-modulated (e.g., includes an OFDM-modulated STF, in an embodiment) or uses SC modulation (e.g., includes an SC SYNC field, in an embodiment).

At block 926, an OFDM portion is generated using the first clock rate. The OFDM portion follows the first preamble portion in the data unit being generated, and includes a second preamble portion that includes one or more LTFs. In an embodiment, the OFDM portion also includes a data portion of a data unit. In some embodiments, the OFDM portion is the same as a corresponding portion of a short range data unit or long range data unit as described in connection with FIGS. 2-5. In some of these embodiments, the design of the OFDM portion is based on the PHY mode determined at block 922.

On the other hand, if it is determined at block 922 that the PHY mode is the second PHY mode, the flow proceeds to block 930. At block 930, a first preamble portion is generated using a second clock rate that corresponds to the second PHY mode. In some embodiments, the first preamble portion generated at block 930 is the same as or similar to the first preamble portion generated at block 924, with the exception of the clock rate (and therefore length) of the first preamble portion. For example, in an embodiment, the first preamble portion generated at block 930 uses the same type of modulation (e.g., OFDM, SC, etc.), and includes the same repeating sequence and the same number of repetitions of the sequence, as the first preamble portion generated at block 924. The second clock rate is lower than the first clock rate (e.g., in some embodiments, by an integer factor N).

At block 932, an OFDM portion is generated using the second clock rate. The OFDM portion follows the first preamble portion in the data unit being generated, and includes a second preamble portion that includes one or more LTFs. In some embodiments, the OFDM portion generated at block 932 is the same as the OFDM portion generated at block 926, with the exception of the clock rate (and therefore length) of the OFDM portion.

In some embodiments, the method 920 of FIG. 15 includes additional method elements not shown. For example, in an embodiment, after block 926 and after block 932, an additional method element includes transmitting via a communication channel (e.g., a wireless communication channel) a data unit that includes both the generated first preamble portion and the generated OFDM portion. Moreover, although blocks 926 and 932 are shown later in the flow diagram of example method 920 than blocks 924 and 930, respectively, blocks 926 and 932 occur before, or simultaneously with, blocks 924 and 930 in other embodiments.

Figure 16:
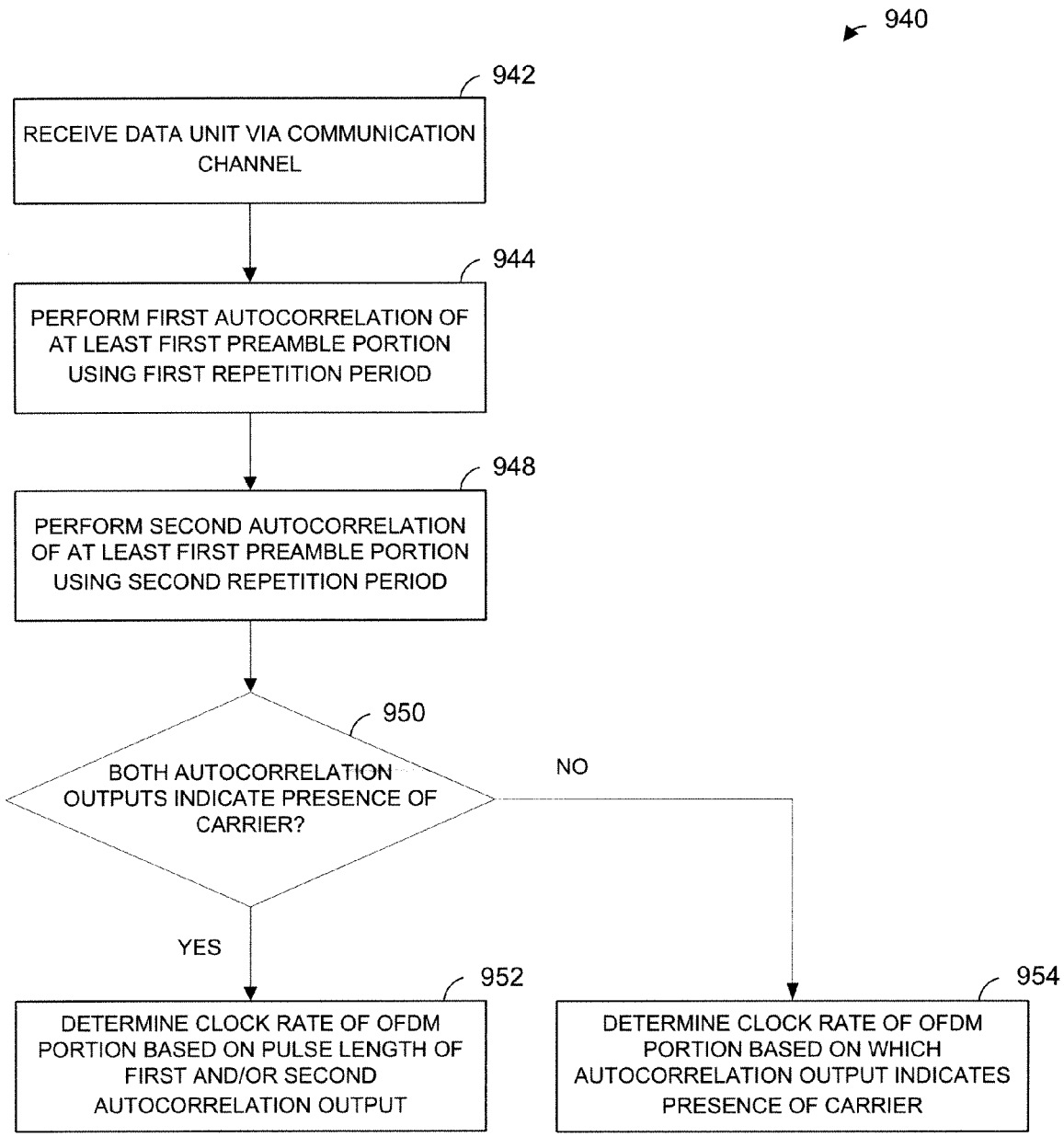
FIG. 16 is a flow diagram of an example method for auto-detecting a clock rate of a data unit generated according to the first example preamble design, according to an embodiment.

FIG. 16 is a flow diagram of an example method 940 for auto-detecting a clock rate of a data unit generated according to the first example preamble design (of which an example embodiment is shown in FIG. 7), according to an embodiment. In some embodiments, an AP such as the AP 14 of FIG. 1 (and/or a client station such as the client station 25-1) is configured to implement the method 940.

At block 942, a data unit is received via a communication channel. Block 942 is similar to block 912 of the method 910 in FIG. 14, in some embodiments. The data unit received at block 942 includes a first preamble portion, and an OFDM portion that follows the first preamble portion. The OFDM portion of the data unit includes a second preamble portion including one or more LTFs. According to various embodiments, the received data unit is a data unit having the preamble design described in connection with FIG. 7. Additionally or alternatively, according to various embodiments, the received data unit is a data unit generated according to the method 900 of FIG. 15.

At block 944, a first autocorrelation of at least the first preamble portion of the data unit received at block 942 is performed, where the first autocorrelation is performed using a first repetition period and outputs a first carrier sense signal. In an embodiment, the first repetition period is the same as a first potential length of a repeating sequence in the first preamble portion. For example, for the example preamble design shown in FIG. 7, the first repetition period is equal to 0.8 µs or another suitable duration.

At block 948, a second autocorrelation of at least the first preamble portion of the data unit received at block 942 is performed, where the second autocorrelation is performed using a second repetition period and outputs a second carrier sense signal. In an embodiment, the second repetition period is the same as a second potential length of a repeating sequence in the first preamble portion, different than the first potential length. For example, for the example preamble design shown in FIG. 7, the second repetition period is equal to 3.2 μs or another suitable duration. In an embodiment, the first autocorrelation of block 944 is performed at least partially in parallel with the second autocorrelation at block 948.

At block 950, it is determined whether both the first autocorrelation and the second autocorrelation indicate the presence of a carrier (e.g., whether the first carrier sense signal and the second carrier sense signal indicate the presence of a carrier, in an embodiment). For example, in an embodiment, it is determined whether both the first carrier sense signal and the second carrier sense signal are at a "high" level (or any other indicator of a relatively strong autocorrelation).

If it is determined at block 950 that both the first autocorrelation and the second autocorrelation indicate the presence of a carrier, flow proceeds to block 952. At block 952, the clock rate of the OFDM portion of the data unit received at block 942 is determined based on a pulse length of the first carrier sense signal (i.e., the first autocorrelation output,) and/or a pulse length of the second carrier sense signal (i.e., the second autocorrelation output). In an embodiment, the clock rate of the OFDM portion is determined to be a first clock rate if the first carrier sense signal and/or the second carrier sense signal are at a "high" level (or any other suitable indicator of a relatively strong autocorrelation) for a first length of time (e.g., 0.8 μs), and is determined to be a lower, second clock rate if the first carrier sense signal and/or the second carrier sense signal are at a "high" level (or any other suitable indicator of a relatively strong autocorrelation) for a longer, second length of time (e.g., 3.2 μs). In some embodiments, the determination at block 950 is performed by determining whether a pulse length of the first and/or second carrier sense signal is in a first length range (e.g., less than 10 μs) or a second length range (e.g., greater than 10 μs). In an embodiment, the pulse length of the first and second carrier sense signals corresponds to the length of time between i) sensing a carrier and ii) detecting a transition from the first preamble portion of the received data unit to the second preamble portion of the received data unit.

On the other hand, if it is determined at block 950 that the first autocorrelation output or the second autocorrelation output (but not both) does not indicate the presence of a carrier, flow proceeds to block 954. At block 954, the clock rate of the OFDM portion of the data unit received at block 942 is determined based on which autocorrelation indicates the presence of a carrier. For example, in an embodiment, the clock rate of the OFDM portion is determined to be a first clock rate when the first (but not the second) autocorrelation indicates a carrier sense, and is determined to be a lower, second clock rate when the second (but not the first) autocorrelation indicates a carrier sense.

In some embodiments, the method 940 includes additional method elements not shown in FIG. 16. For example, in an embodiment, the method 940 includes providing, prior to receiving the data unit at block 942, a receiver clock rate that corresponds to the first, higher potential clock rate of received data units. Moreover, while the method 940 has been described with reference to determining a first and a second clock rate, some embodiments include additional method elements (e.g., similar to blocks 944 and 948) corresponding to a third clock rate, a third and a fourth clock rate, etc., where it is also determined at block 952 or 954 whether the clock rate of the OFDM portion is one of these additional potential clock rates. In embodiments utilizing a third or more clock rates, block 950 is modified to determine whether more than one autocorrelation output indicates presence of a carrier, and block 952 is modified to consider a third or more autocorrelation outputs.

Figure 17:
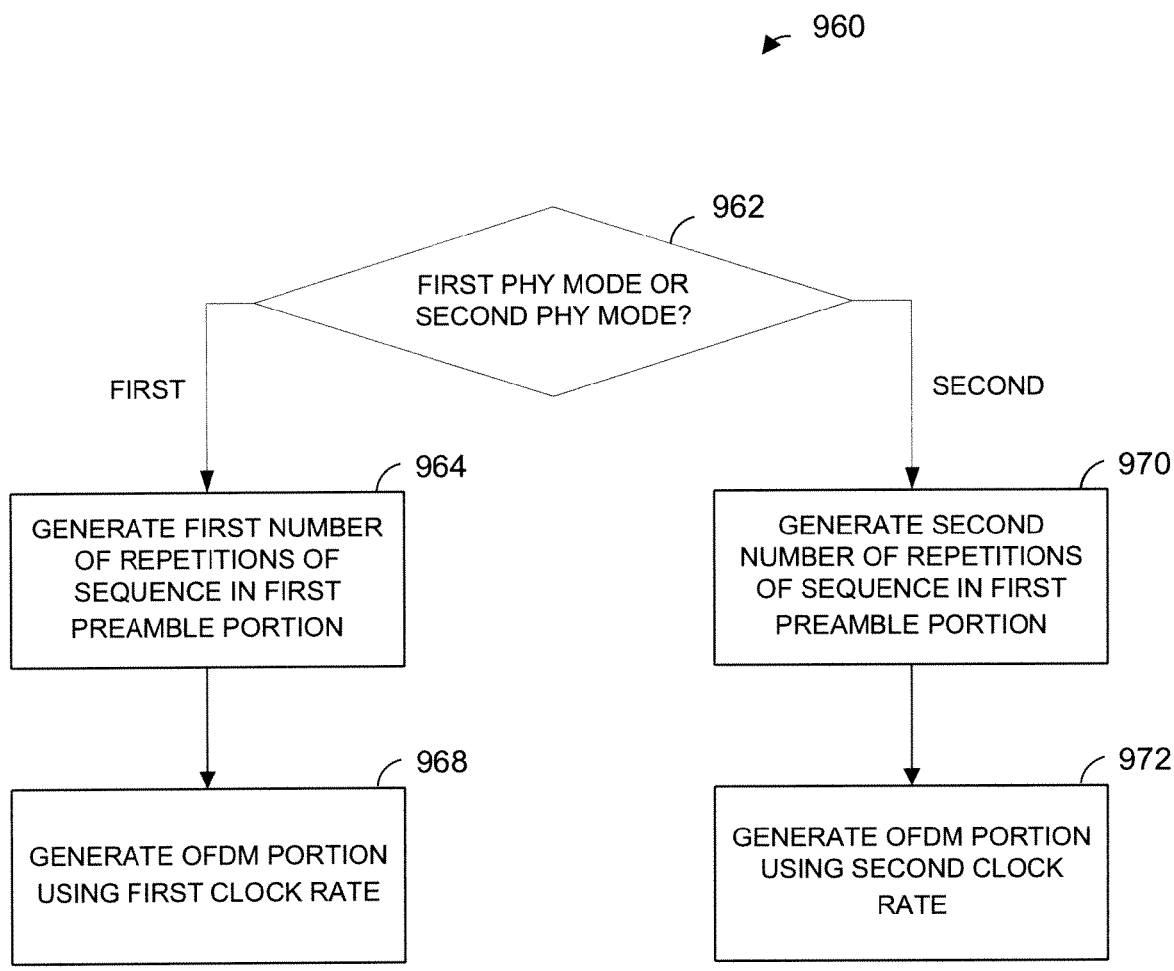
FIG. 17 is a flow diagram of an example method for generating a data unit according to the second example preamble design, according to an embodiment.

FIG. 17 is a flow diagram of an example method 960 for generating a data unit according to the second example preamble design (of which an example embodiment is shown in FIG. 8), according to an embodiment. In some embodiments, an AP such as the AP 14 of FIG. 1 (and/or a client station such as the client station 25-1) is configured to implement the method 960 to generate a data unit for transmission over a communication channel.

At block 962, it is determined whether a PHY mode of a communication device implementing the method 960 is a first PHY mode or a second PHY mode. In various embodiments, block 962 is similar to block 922 of method 920 in FIG. 15.

If it is determined at block 962 that the PHY mode is the first PHY mode, the flow proceeds to block 964. At block 964, a first number of repetitions (i.e., one or more repetitions) of a sequence is generated in a first preamble portion. In some embodiments, the first preamble portion is generated using a first clock rate corresponding to the clock rate of an OFDM portion when in the first PHY mode, while in other embodiments the first preamble portion is generated using a second clock rate that corresponds to the clock rate of an OFDM portion when in the second PHY mode. In an embodiment, the repeated sequences of the first preamble portion are OFDM-modulated (e.g., are OFDM-modulated sequences of an STF, in an embodiment).

At block 968, an OFDM portion is generated using the first clock rate. In various embodiments, block 968 is similar to block 926 of method 920 in FIG. 15.

If it is determined at block 962 that the PHY mode is the second PHY mode, the flow proceeds to block 970. At block 970, a second number of repetitions of a sequence is generated in a first preamble portion. The second number of repetitions is greater than the first number of repetitions generated at block 964, and causes the first preamble portion to be longer than the first preamble portion generated at block 964. In an embodiment, each repeating sequence generated at block 970 is the same as each repeating sequence generated at block 964. For example, in an embodiment, the sequences of the first preamble portion are generated at block 970 using the same clock rate as is used to generate the sequences of the first preamble portion at block 964, and the sequences of the first preamble portions generated at blocks 964 and 970 are both OFDM-modulated sequences of an STF.

At block 972, an OFDM portion is generated using the second clock rate. In various embodiments, block 972 is similar to block 932 of method 920 in FIG. 15.

In some embodiments, the method 960 of FIG. 17 includes additional method elements not shown. For example, in an embodiment, after block 968 and block 972 an additional method element includes transmitting via a communication channel (e.g., a wireless communication channel) a data unit that includes both the generated first preamble portion and the generated OFDM portion. Moreover, although blocks 968 and 972 are shown later in the flow diagram of example method 960 than blocks 964 and 970, respectively, blocks 968 and 972 occur before, or simultaneously with, blocks 964 and 970 in other embodiments.

Figure 18:
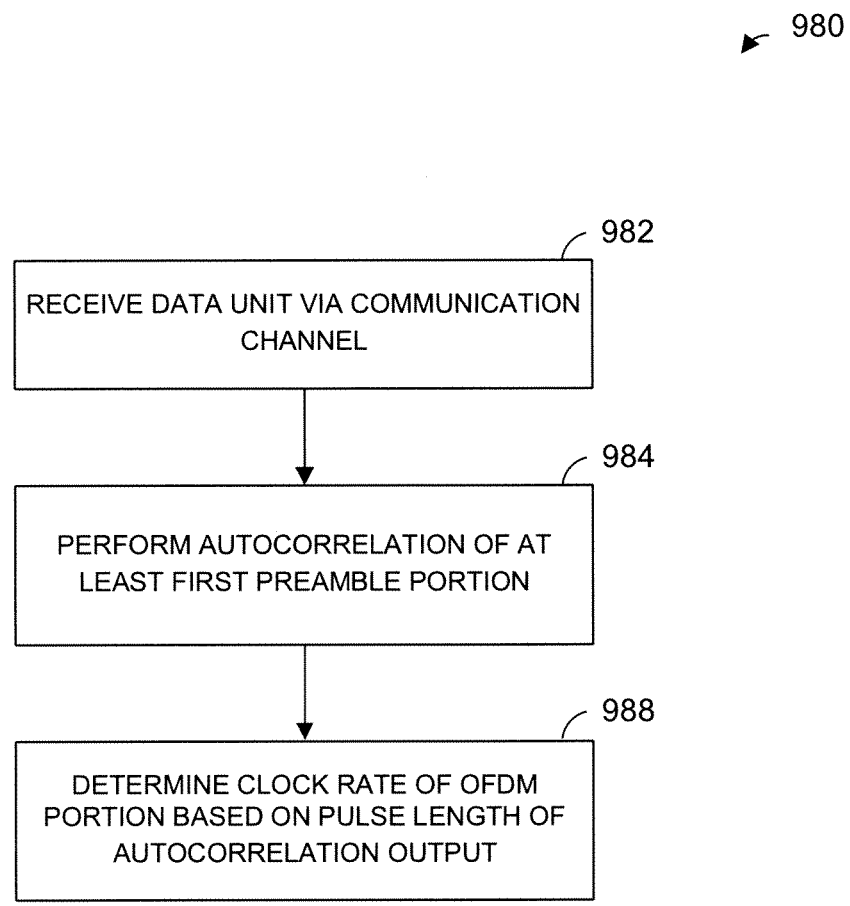
FIG. 18 is a flow diagram of an example method for auto-detecting a clock rate of a data unit generated according to the second example preamble design, according to an embodiment.

FIG. 18 is a flow diagram of an example method 980 for auto-detecting a clock rate of a data unit generated according to the second example preamble design (of which an example embodiment is shown in FIG. 8), according to an embodiment. In some embodiments, an AP such as the AP 14 of FIG. 1 (and/or a client station such as the client station 25-1) is configured to implement the method 980.

At block 982, a data unit is received via a communication channel. Block 982 is similar to block 912 of the method 910 in FIG. 14, in some embodiments. The data unit received at block 982 includes a first preamble portion, and an OFDM portion that follows the first preamble portion. The OFDM portion of the data unit includes a second preamble portion including one or more LTFs. According to various embodiments, the received data unit is a data unit having the preamble design described in connection with FIG. 8. Additionally or alternatively, according to various embodiments, the received data unit is a data unit generated according to the method 960 of FIG. 17.

At block 984, an autocorrelation of at least a first preamble portion of the data unit received at block 982 is performed, where the autocorrelation outputs a carrier sense signal.

At block 988, the clock rate of the OFDM portion of the data unit received at block 982 is determined based on a pulse length of the carrier sense signal (i.e., the autocorrelation output). In an embodiment, the clock rate of the OFDM portion is determined to be a first clock rate if the carrier sense signal is at a "high" level (or any other indicator of a relatively strong autocorrelation) for a first length of time (e.g., 0.8 µs), and is determined to be a lower, second clock rate if the carrier sense signal is at a "high" level (or any other indicator of a relatively strong autocorrelation) for a longer, second length of time (e.g., 3.2 µs). In some embodiments, the determination at block 988 is performed by determining whether a pulse length of the carrier sense signal is in a first length range (e.g., less than 10 µs) or a second length range (e.g., greater than 10 µs). The pulse length depends on the number of repeated sequences in the first preamble portion of the data unit, in an embodiment. In an embodiment, the pulse length of the carrier sense signal (e.g., duration of a pulse in the carrier sense signal) corresponds to an estimation of a length of time between i) sensing a carrier and ii) detecting a transition from the first preamble portion of the received data unit to the second preamble portion of the received data unit.

In some embodiments, the method 988 includes additional method elements not shown in FIG. 18. For example, in an embodiment, the method 980 includes providing, prior to receiving the data unit at block 982, a receiver clock rate that corresponds to the first, higher potential clock rate of received data units. Moreover, while the method 980 has been described with reference to determining a first and a second clock rate, some embodiments include additional method elements (e.g., similar to block 984) corresponding to a third clock rate, a third and a fourth clock rate, etc., where it is also determined at block 988 whether the clock rate of the OFDM portion is one of these additional potential clock rates.

Figure 19:
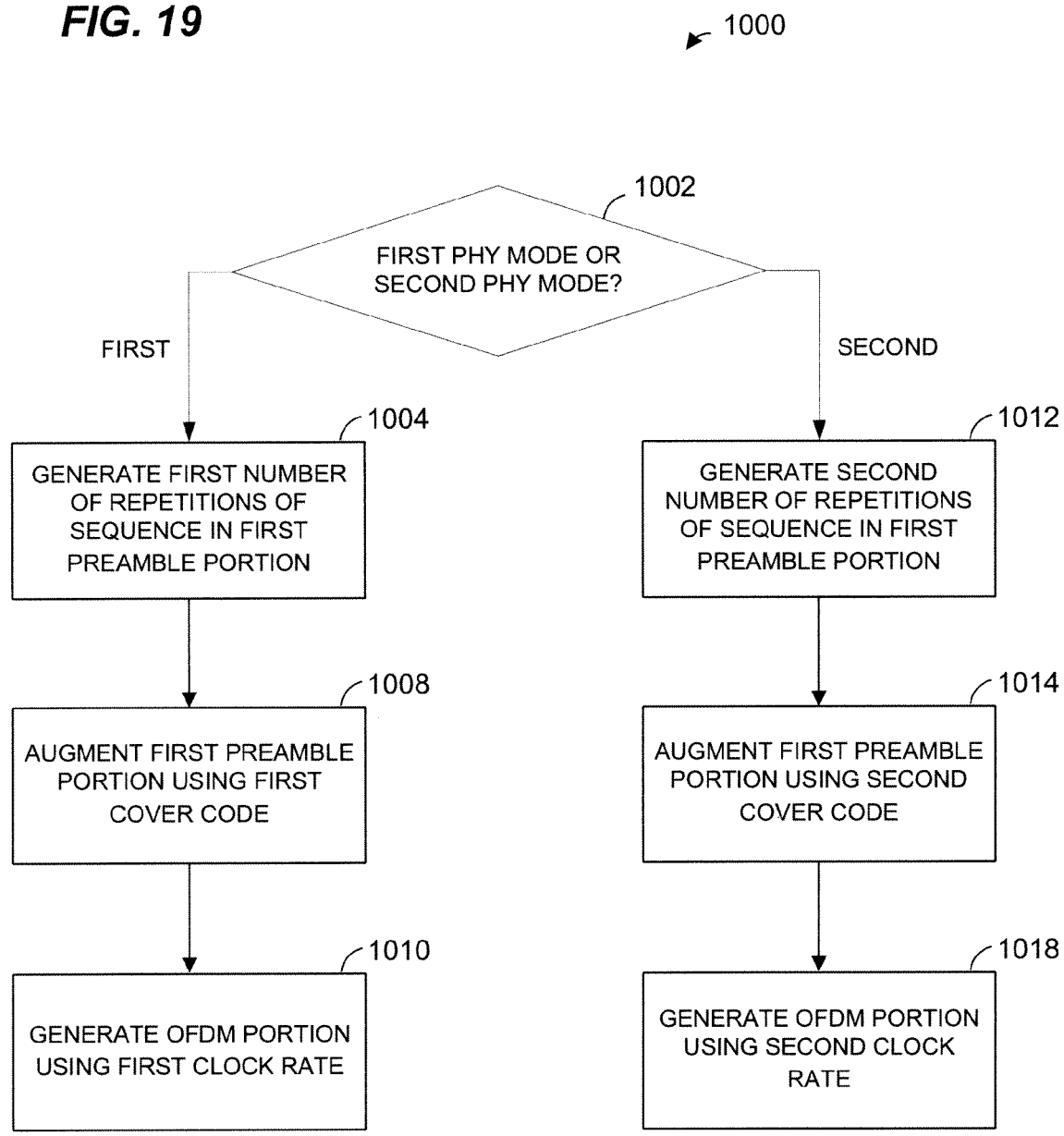
FIG. 19 is a flow diagram of an example method for generating a data unit according to the third example preamble design, according to an embodiment.

FIG. 19 is a flow diagram of an example method 1000 for generating a data unit according to the third example preamble design (of which an example embodiment is shown in FIG. 9), according to an embodiment. In some embodiments, an AP such as the AP 14 of FIG. 1 (and/or a client station such as the client station 25-1) is configured to implement the method 1000 to generate a data unit for transmission over a communication channel.

At block 1002, it is determined whether a PHY mode of a communication device implementing the method 1000 is a first PHY mode or a second PHY mode. In various embodiments, block 1002 is similar to block 922 of method 920 in FIG. 15.

If it is determined at block 1002 that the PHY mode is the first PHY mode, the flow proceeds to block 1004. At block 1004, a first number of repetitions (i.e., one or more repetitions) of a sequence (i.e., one or more repetitions) is generated in a first preamble portion. Block 1004 is similar to block 964 in method 960 of FIG. 17, in an embodiment.

At block 1008, the first preamble portion generated at block 1004 is augmented using a first cover code. For example, in an embodiment, the first preamble portion is augmented using a sequence of all ones (i.e., such that the polarity of all bits in all repeating sequences of the first preamble portion is not changed). In one embodiment where the first cover code is a sequence of all ones, augmenting the first preamble portion at block 1008 comprises simply not performing any cover code processing operation on the first preamble portion. In an embodiment where the first cover code is a sequence of all ones, block 1008 is omitted.

At block 1010, an OFDM portion is generated using a first clock rate corresponding to the first PHY mode. In various embodiments, block 968 is similar to block 926 of method 920 in FIG. 15.

If it is determined at block 1002 that the PHY mode is the second PHY mode, the flow proceeds to block 1012. At block 1012, a second number of repetitions (i.e., one or more repetitions) of a sequence is generated in a first preamble portion. In one embodiment, the second number of repetitions is the same as the first number of repetitions generated at block 1004 (i.e., the number of repetitions, and therefore first preamble portion length, does not reflect the PHY mode or the clock rate of the OFDM portion). In another embodiment, the second number of repetitions is greater than the first number of repetitions generated at block 1004, and results in the first preamble portion being longer than the first preamble portion generated at block 1004. In an embodiment, each repeating sequence generated at block 1012 is the same as each repeating sequence generated at block 1004. For example, in an embodiment, the sequences of the first preamble portion are generated at block 1012 using the same clock rate as is used to generate the sequences of the first preamble portion at block 1004, and the sequences of the first preamble portions generated at blocks 1004 and 1012 are both OFDM-modulated sequences of an STF.

At block 1014, the first preamble portion generated at block 1012 is augmented using a second cover code that is different than the first cover code utilized for the first PHY mode. For example, in one embodiment where the first cover code is a sequence of all ones, the first preamble portion is augmented at block 1014 using a series of alternating positive and negative ones (e.g., such that the polarity of all bits in every second instance of the sequence is changed, in an embodiment). In an embodiment where the second cover code is a sequence of all ones, augmenting the first preamble portion at block 1014 comprises simply not performing any cover code processing operation on the first preamble portion. In an embodiment where the second cover code is a sequence of all ones, block 1014 is omitted.

At block 1018, an OFDM portion is generated using a second clock rate corresponding to the second PHY mode. In various embodiments, block 1018 is similar to block 932 of method 920 in FIG. 15.

In some embodiments, the method 1000 of FIG. 19 includes additional method elements not shown. For example, in an embodiment, after block 1010 block 1018, an additional method element includes transmitting via a communication channel (e.g., a wireless communication channel) a data unit that includes both the generated first preamble portion and the generated OFDM portion. Moreover, the sequence of blocks in each path of the method 1000 is different in various embodiments, and/or one or more of the blocks of the method 1000 is performed simultaneously with other blocks. For example, blocks 1004 and 1008 (or blocks 1012 and 1014) occur after or in parallel with block 1010 (or block 1018), in an embodiment.

Figure 20:
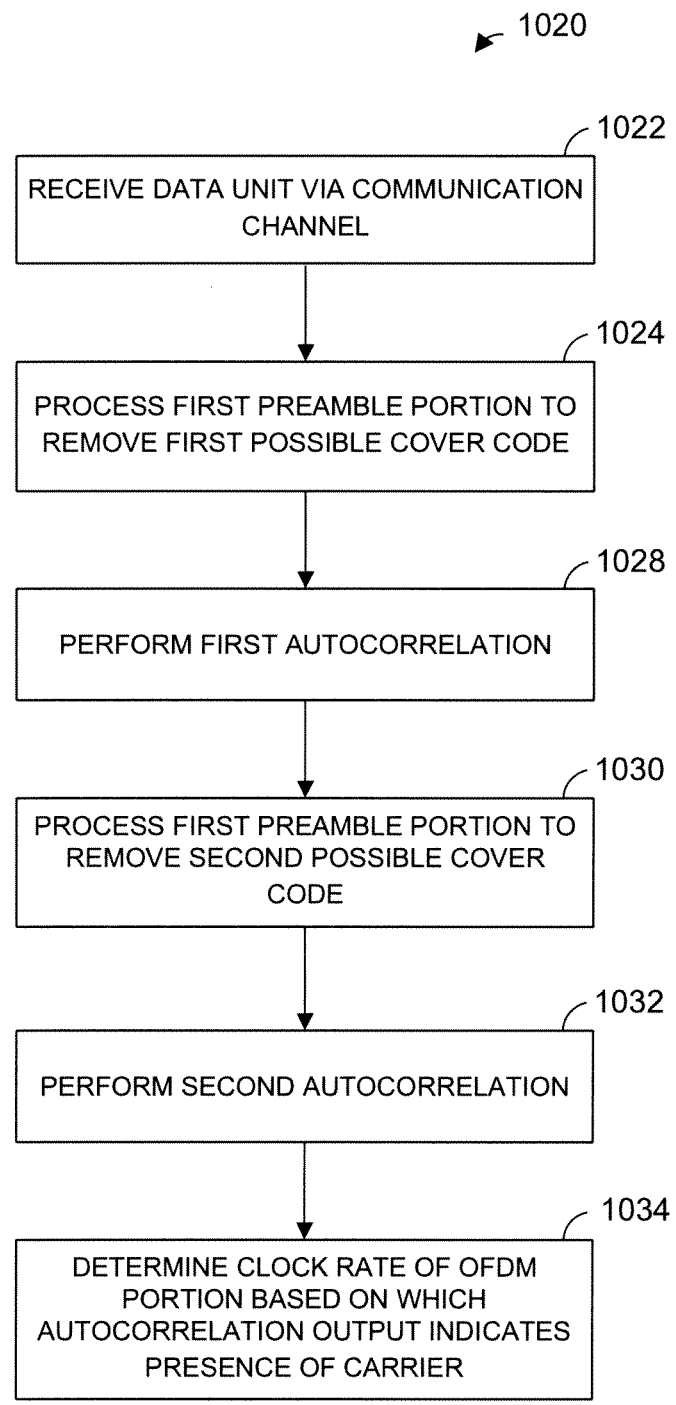
FIG. 20 is a flow diagram of an example method for auto-detecting a clock rate of a data unit generated according to the third example preamble design, according to an embodiment.

FIG. 20 is a flow diagram of an example method 1020 for auto-detecting a clock rate of a data unit generated according to the third example preamble design (of which an example embodiment is shown in FIG. 9), according to an embodiment. In some embodiments, an AP such as the AP 14 of FIG. 1 (and/or a client station such as the client station 25-1) is configured to implement the method 1020.

At block 1022, a data unit is received via a communication channel. Block 1022 is similar to block 912 of the method 910 in FIG. 14, in some embodiments. The data unit received at block 1022 includes a first preamble portion, and an OFDM portion that follows the first preamble portion. The OFDM portion of the data unit includes a second preamble portion including one or more LTFs. According to various embodiments, the received data unit is a data unit having the preamble design described in connection with FIG. 9. Additionally or alternatively, according to various embodiments, the received data unit is a data unit generated according to the method 1000 of FIG. 19.

At block 1024, at least a first preamble portion of the data unit received at block 1022 is processed to remove or undo a first possible cover code. For example, in an embodiment, a first possible cover code is a series of ones, utilized by transmitting devices that transmit data units in a first PHY mode using a first clock rate. In an embodiment where the first possible cover code is a series of ones, block 1024 is omitted.

At block 1028, a first autocorrelation of at least the first preamble portion (as processed at block 1024) is performed. The first autocorrelation is performed using a first repetition period and outputs a first carrier sense signal. In an embodiment, block 1028 is similar to block 944 of FIG. 16.

At block 1030, at least the first preamble portion of the data unit received at block 1022 is processed to remove or undo a second possible cover code. For example, in one embodiment where the first possible cover code is a series of ones utilized by transmitting devices in a first PHY mode using a first clock rate, a second possible cover code is a series of alternating positive and negative ones utilized by transmitting devices in a second PHY mode using a second clock rate different than the first clock rate. In an embodiment, block 1030 is performed in parallel with block 1024. In an embodiment where the second possible cover code is a series of ones, block 1030 is omitted.

At block 1032, a second autocorrelation of at least the first preamble portion (as processed at block 1030) is performed, where the second autocorrelation is performed using a second repetition period and outputs a second carrier sense signal. In an embodiment, block 1032 is similar to block 948 of FIG. 16 (e.g., in an embodiment, block 1032 is performed in parallel with block 1028).

At block 1034, the clock rate of the OFDM portion of the data unit received at block 1022 is determined based on which autocorrelation output indicates the presence of a carrier. For example, in an embodiment, if the first carrier sense signal output by the first autocorrelation performed at block 1028 indicates the presence of a carrier (e.g., outputs a "high" level, or otherwise indicates a relatively strong autocorrelation), it is determined that the clock rate is the first clock rate, and if the second carrier sense signal output by the second autocorrelation performed at block 1032 indicates the presence of a carrier (e.g., outputs a "high" level, or otherwise indicates a relatively strong autocorrelation), it is determined that the clock rate is the second clock rate.

Because each of the first and second autocorrelations follows processing that attempts to remove or undo one of the alternative cover codes of the preamble design scheme, most likely only one of the first and second carrier sense signals will indicate the presence of a carrier. Moreover, this carrier sensing generally occurs near the beginning of a carrier sense signal pulse, without having to wait to see the length of the pulse. Accordingly, in an embodiment, the receiver clock is dynamically adjusted to correspond to the clock rate of the received data unit based on the determination at block 1034.

In some embodiments, the method 1020 includes additional method elements not shown in FIG. 20, such as dynamically adjusting the receiver clock as described above, for example. Moreover, while the method 1020 has been described with reference to determining a first and a second clock rate, some embodiments include additional method elements (e.g., similar to blocks 1024 and 1028) corresponding to a third clock rate, a third and a fourth clock rate, etc., where it is also determined at block 1034 whether the clock rate of the OFDM portion is one of these additional potential clock rates.

Figure 21:
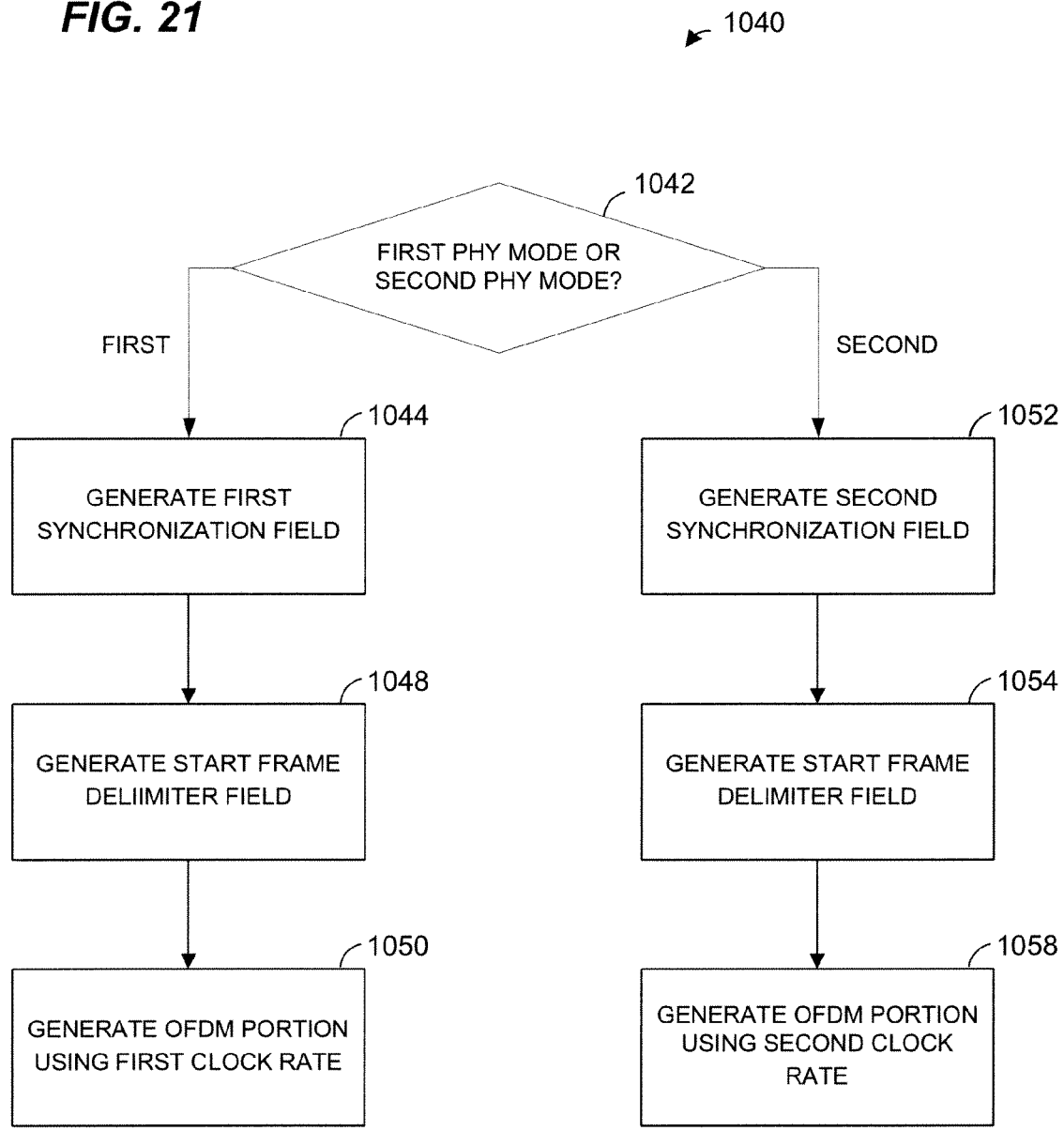
FIG. 21 is a flow diagram of an example method for generating a data unit according to the fourth or fifth example preamble design, according to an embodiment.

FIG. 21 is a flow diagram of an example method 1040 for generating a data unit according to the fourth or fifth example preamble design (of which example embodiments are shown in FIGS. 10 and 11, respectively), according to an embodiment. In some embodiments, an AP such as the AP 14 of FIG. 1 (and/or a client station such as the client station 25-1) is configured to implement the method 1040 to generate a data unit for transmission over a communication channel.

At block 1042, it is determined whether a PHY mode of a communication device implementing the method 1040 is a first PHY mode or a second PHY mode. In various embodiments, block 1042 is similar to block 922 of method 920 in FIG. 15.

If it is determined at block 1042 that the PHY mode is the first PHY mode, the flow proceeds to block 1044. At block 1044, a first SYNC field is generated in a first preamble portion, where the first preamble portion is an SC "extra preamble" portion as discussed above. In some embodiments, the first SYNC field includes a repeating sequence (e.g., a repeating Barker sequence, Golay code sequence, etc., according to various embodiments). In an embodiment, the first SYNC field is the same as or substantially similar to a SYNC field conforming to the IEEE 802.11b standard.

At block 1048, a start frame delimiter (SFD) field is generated. The SFD field is included in the first preamble portion and follows the SYNC field generated at block 1044. In an embodiment, the SFD field is the same as or substantially similar to an SFD field conforming to the IEEE 802.11b standard. The SFD field is clocked at the same rate as the SYNC field, in an embodiment.

At block 1050, an OFDM portion is generated using a first clock rate corresponding to the first PHY mode. In various embodiments, block 1050 is similar to block 926 of method 920 in FIG. 15.

If it is determined at block 1042 that the PHY mode is the second PHY mode, the flow proceeds to block 1052. At block 1052, a second SYNC field, different than the first SYNC field generated at block 1044, is generated in a first preamble portion. In one embodiment, the second SYNC field has a length that is different than the length of the first SYNC field generated at block 1044. Alternatively, in another embodiment, the second SYNC field includes a repeating sequence that is complementary to a repeating sequence of the first SYNC field. For example, in an embodiment, the first and second SYNC fields include complementary Golay code sequences. In an embodiment, the second SYNC field is the same as or substantially similar to a SYNC field conforming to the IEEE 802.11b standard. Moreover, in an embodiment, the second SYNC field is clocked at the same rate as the first SYNC field.

At block 1054, an SFD field is generated. The SFD field is included in the first preamble portion and follows the SYNC field generated at block 1052. In one embodiment, the SFD field generated at block 1054 is the same as the SFD field generated at block 1048. In another embodiment, the SFD field generated at block 1054 is different than the SFD field generated at block 1048. For example, in an embodiment where the first and second SYNC fields generated at blocks 1044 and 1052 include complementary Golay code sequences Ga and Gb, respectively, the SFD field generated at block 1048 includes one or more repetitions of Gb and the SFD field generated at block 1054 includes one or more repetitions of Ga. The SFD field is clocked at the same rate as the SYNC field, in an embodiment.

At block 1058, an OFDM portion is generated using a second clock rate corresponding to the second PHY mode. In various embodiments, block 1058 is similar to block 926 of method 920 in FIG. 15.

In some embodiments, the method 1040 of FIG. 21 includes additional method elements not shown. For example, in an embodiment, after block 1050 and block 1058 an additional method element includes transmitting via a communication channel (e.g., a wireless communication channel) a data unit that includes both the generated first preamble portion and the generated OFDM portion. Moreover, the sequence of blocks in each path of the method 1040 is different in various embodiments, and/or one or more of the blocks of the method 1040 is performed simultaneously with other blocks For example, blocks 1044 and 1048 (or blocks 1052 and 1054) occur after or in parallel with block 1050 (or block 1058), in an embodiment. Further, in some embodiments, blocks 1048 and 1054 are omitted (i.e., the generated first preamble portion, and therefore the generated data unit, does not include an SFD regardless of PHY mode). Still further, in some embodiments where blocks 1048 and 1054 are included (i.e., an SFD is included in the first preamble portion), the OFDM portion generated at block 1050 and at block 1058 does not include an STF, and an LTF of the OFDM portion immediately follows the SFD of the first preamble portion.

Figure 22:
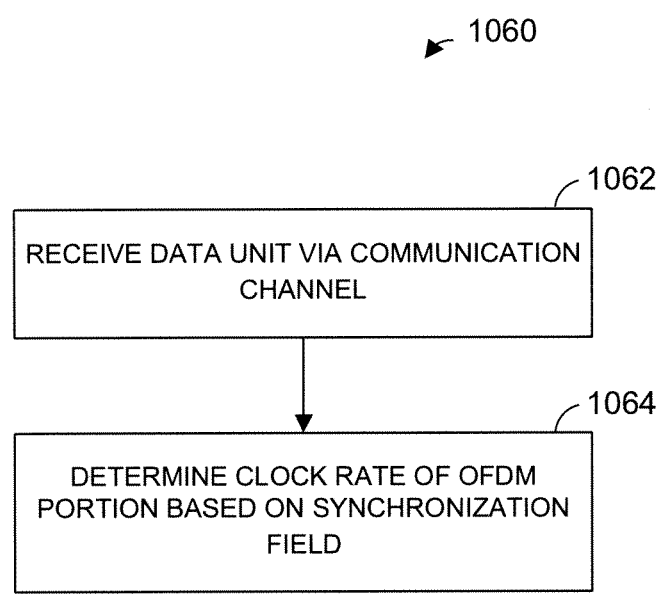
FIG. 22 is a flow diagram of an example method for auto-detecting a clock rate of a data unit generated according to the fourth or fifth example preamble design, according to an embodiment.

FIG. 22 is a flow diagram of an example method 1060 for auto-detecting a clock rate of a data unit generated according to the fourth or fifth example preamble design (of which example embodiments are shown in FIGS. 10 and 11, respectively), according to an embodiment. In some embodiments, an AP such as the AP 14 of FIG. 1 (and/or a client station such as the client station 25-1) is configured to implement the method 1060.

At block 1062, a data unit is received via a communication channel. Block 1062 is similar to block 912 of the method 910 in FIG. 14, in some embodiments. The data unit received at block 1062 includes a first preamble portion that is an SC "extra preamble" including a SYNC field and, in some embodiments, an SFD following the SYNC field. An OFDM portion of the data unit follows the first preamble portion. The OFDM portion of the data unit includes a second preamble portion including one or more LTFs and, in some embodiments, an STF preceding the LTF(s). According to various embodiments, the received data unit is a data unit having the preamble design described in connection with FIG. 10 or a data unit having the preamble design described in connection with FIG. 11. Additionally or alternatively, according to various embodiments, the received data unit is a data unit generated according to the method 1040 of FIG. 21.

At block 1064, a clock rate of the OFDM portion of the data unit received at block 1062 is auto-detected or determined based on the SYNC field in the first preamble portion of the data unit. More specifically, it is determined whether the clock rate is a first clock rate corresponding to a first PHY mode or a lower, second clock rate corresponding to a second PHY mode, in an embodiment. In various embodiments, the PHY modes are similar to any of the PHY modes described in connection with block 902 of method 900 in FIG. 13.

In some embodiments, the clock rate of the OFDM portion is determined based on a length of the SYNC field (e.g., when received data units conform to the fourth example preamble design of FIG. 10). In other embodiments, the clock rate of the OFDM portion is determined based on the repeating sequence of the SYNC field (e.g., when received data units conform to the fourth example preamble design of FIG. 11). For example, in an embodiment, the clock rate is determined based on whether a first Golay code sequence is included in the SYNC field or a second, complementary Golay code sequence is included in the SYNC field. In one embodiment, where received data units also utilize different SFDs to indicate the clock rate, determining the clock rate at block 1064 includes determining the clock rate also based on the SFD of the first preamble portion of the received data unit.

Although FIG. 22 shows only blocks 1062 and 1064 in the method 1060, some embodiments include additional method elements. Moreover, while the method 1060 has been described with reference to determining a first or a second clock rate, some embodiments additionally determine (at block 1064) whether the clock rate is a third clock rate, whether the clock rate is a third or fourth clock rate, etc.

Figure 23:
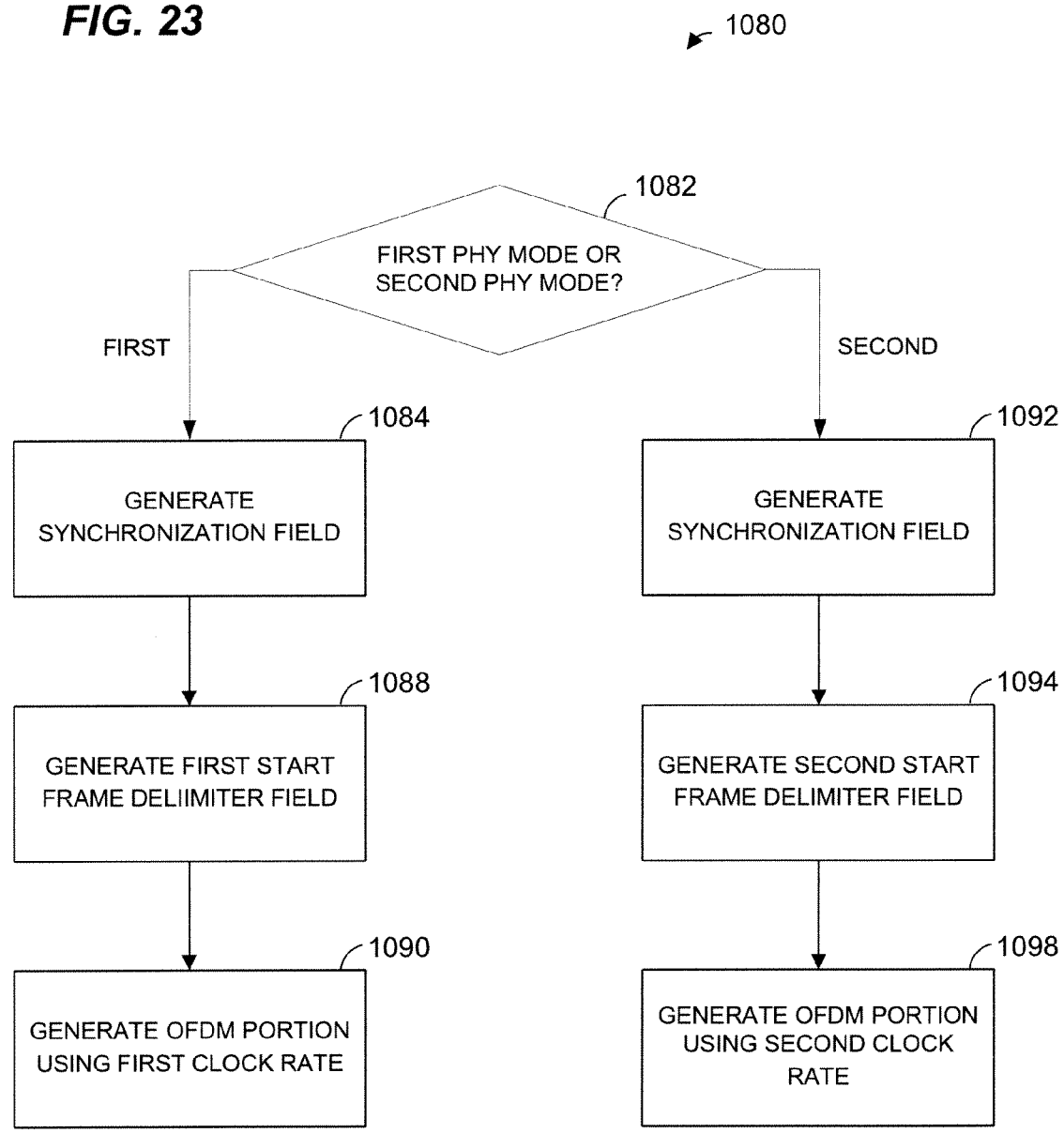
FIG. 23 is a flow diagram of an example method for generating a data unit according to the sixth example preamble design, according to an embodiment.

FIG. 23 is a flow diagram of an example method 1080 for generating a data unit according to the sixth example preamble design (of which an example embodiment is shown in FIG. 12), according to an embodiment. In some embodiments, an AP such as the AP 14 of FIG. 1 (and/or a client station such as the client station 25-1) is configured to implement the method 1080 to generate a data unit for transmission over a communication channel.

At block 1082, it is determined whether a PHY mode of a communication device implementing the method 1080 is a first PHY mode or a second PHY mode. In various embodiments, block 1082 is similar to block 922 of method 920 in FIG. 15.

If it is determined at block 1082 that the PHY mode is the first PHY mode, the flow proceeds to block 1084. At block 1084, a SYNC field is generated in a first preamble portion, where the first preamble portion is an SC "extra preamble" portion as discussed above. In some embodiments, the SYNC field includes a repeating sequence (e.g., a repeating Barker sequence, Golay code sequence, etc., according to various embodiments). In an embodiment, the SYNC field is the same as or substantially similar to a SYNC field conforming to the IEEE 802.11b standard.

At block 1088, a first SFD field is generated. The first SFD field is included in the first preamble portion and follows the SYNC field generated at block 1084. In an embodiment, the first SFD field is the same as or substantially similar to an SFD field conforming to the IEEE 802.11b standard. The SFD field is clocked at the same rate as the SYNC field, in an embodiment.

At block 1090, an OFDM portion is generated using a first clock rate corresponding to the first PHY mode. In various embodiments, block 1090 is similar to block 926 of method 920 in FIG. 15.

If it is determined at block 1082 that the PHY mode is the second PHY mode, the flow proceeds to block 1092. At block 1092, a SYNC field is generated in a first preamble portion. The SYNC field is the same as or substantially the same as the SYNC field generated at block 1084, in an embodiment.

At block 1094, a second SFD field different than the first SFD field is generated. For example, in one embodiment, the second SFD field includes a sequence that is repeated in the SYNC field but with a sign flip, while the first SFD field includes the same sequence of the SYNC field without the sign flip. As another example, in an embodiment, the second SFD field includes one or more repetitions of a sequence that is different than a sequence repeated one or more times in the first SFD field. The second SFD field is included in the first preamble portion and follows the SYNC field generated at block 1092. The second SFD field is clocked at the same rate as the SYNC field, in an embodiment.

At block 1098, an OFDM portion is generated using a second clock rate corresponding to the second PHY mode. In various embodiments, block 1098 is similar to block 926 of method 920 in FIG. 15.

In some embodiments, the method 1080 of FIG. 23 includes additional method elements not shown. For example, in an embodiment, after block 1090 and block 1098 an additional method element includes transmitting via a communication channel (e.g., a wireless communication channel) a data unit that includes both the generated first preamble portion and the generated OFDM portion. Moreover, the sequence of blocks in each path of the method 1080 is different in various embodiments, and/or one or more of the blocks of the method 1080 is performed simultaneously with other blocks. For example, blocks 1084 and 1088 (or blocks 1092 and 1094) occur after or simultaneously with block 1090 (or block 1098), in an embodiment. In some embodiments, the OFDM portion generated at block 1090 and at block 1098 does not include an STF, and an LTF of the OFDM portion immediately follows the SFD.

Figure 24:
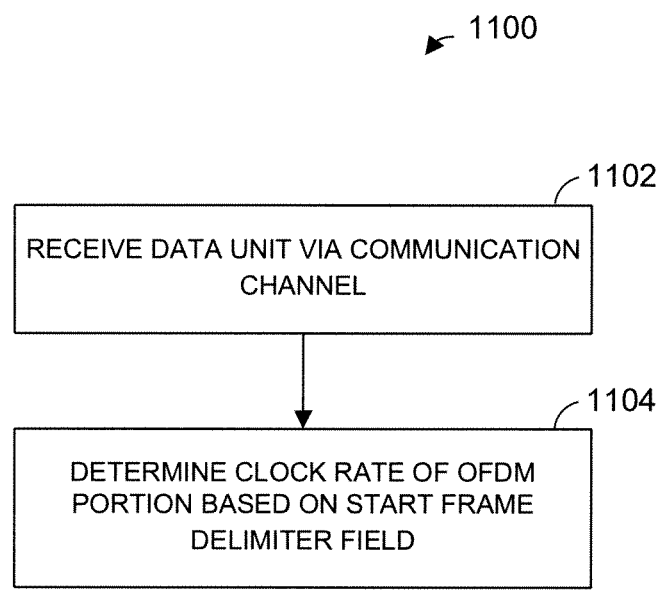
FIG. 24 is a flow diagram of an example method for auto-detecting a clock rate of a data unit generated according to the sixth example preamble design, according to an embodiment.

FIG. 24 is a flow diagram of an example method 1100 for auto-detecting a clock rate of a data unit generated according to the sixth example preamble design (of which an example embodiment is shown in FIG. 12), according to an embodiment. In some embodiments, an AP such as the AP 14 of FIG. 1 (and/or a client station such as the client station 25-1) is configured to implement the method 1100.

At block 1102, a data unit is received via a communication channel. Block 1102 is similar to block 912 of the method 910 in FIG. 14, in some embodiments. The data unit received at block 1102 includes a first preamble portion that is an SC "extra preamble" including a SYNC field and an SFD following the SYNC field. An OFDM portion of the data unit follows the first preamble portion. The OFDM portion of the data unit includes a second preamble portion including one or more LTFs and, in some embodiments, an STF preceding the LTF(s). In some embodiments, however, the second preamble portion does not include an STF, and the LTF(s) immediately follow the SFD of the first preamble portion. According to various embodiments, the received data unit is a data unit having the preamble design described in connection with FIG. 12. Additionally or alternatively, according to various embodiments, the received data unit is a data unit generated according to the method 1080 of FIG. 23.

At block 1104, a clock rate of the OFDM portion of the data unit received at block 1102 is auto-detected or determined based on the SFD field (but not based on the SYNC field) in the first preamble portion of the data unit. More specifically, it is determined whether the clock rate is a first clock rate corresponding to a first PHY mode or a lower, second clock rate corresponding to a second PHY mode, in an embodiment. In various embodiments, the PHY modes are similar to any of the PHY modes described in connection with block 902 of method 900 in FIG. 13.

In some embodiments, the SFD field (and, therefore, the clock rate of the OFDM portion) is determined by performing parallel cross-correlations. For example, in an embodiment, a first cross-correlation correlates a received SFD sequence with a first potential SFD sequence corresponding to the first clock rate, and a second cross-correlation correlates the received SFD sequence with a second potential SFD sequence corresponding to the second clock rate.

Although FIG. 24 shows only blocks 1102 and 1104 in the method 1100, some embodiments include additional method elements. Moreover, while the method 1100 has been described with reference to determining a first and a second clock rate, some embodiments additionally determine (at block 1104) whether the clock rate is a third clock rate, whether the clock rate is a third or fourth clock rate, etc.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perforin various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating a data unit for transmission via a communication channel, the method comprising:
generating a first preamble portion of the data unit based on whether a physical layer (PHY) mode is a first PHY mode or a second PHY mode; and
generating an OFDM portion of the data unit, wherein the OFDM portion
follows the first preamble portion,
includes a second preamble portion including one or more long training fields,
is clocked at a first clock rate when the PHY mode is the first PHY mode, and
is clocked at a second clock rate lower than the first clock rate when the PHY mode is the second PHY mode.

2. A method according to claim 1, wherein generating the first preamble portion based on whether the PHY mode is the first PHY mode or the second PHY mode includes
generating the first preamble portion using the first clock rate when the PHY mode is the first PHY mode, and
generating the first preamble portion using the second clock rate when the PHY mode is the second PHY mode.

3. A method according to claim 1, wherein generating the first preamble portion based on whether the PHY mode is the first PHY mode or the second PHY mode includes
generating a first number of repetitions of a sequence when the PHY mode is the first PHY mode, and
generating a second number of repetitions of the sequence when the PHY mode is the second PHY mode, wherein the second number of repetitions is greater than the first number of repetitions.

4. A method according to claim 1, wherein generating the first preamble portion based on whether the PHY mode is the first PHY mode or the second PHY mode includes,
when the PHY mode is the first PHY mode,
generating a first number of repetitions of a sequence, and
when the PHY mode is the second PHY mode,
generating a second number of repetitions of the sequence, wherein the second number of repetitions is the same as or greater than the first number of repetitions, and
at least one of:
(i) when the PHY mode is the first PHY mode, augmenting the first preamble portion using a first cover code, wherein the first cover code is not used to augment first preamble portion when the PHY mode is the second PHY mode, and
(ii) when the PHY mode is the second PHY mode, augmenting the first preamble portion using a second cover code different than the first cover code, wherein the second cover code is not used to augment first preamble portion when the PHY mode is the first PHY mode.

5. A method according to claim 1, wherein generating the first preamble portion based on whether the PHY mode is the first PHY mode or the second PHY mode includes
generating a first synchronization field when the PHY mode is the first PHY mode, and
generating a second synchronization field different than the first synchronization field when the PHY mode is the second PHY mode.

6. A method according to claim 5, wherein
the first synchronization field is generated using a clock rate and has a first length, and
the second synchronization field is generated using the clock rate and has a second length greater than the first length.

7. A method according to claim 5, wherein
generating the first synchronization field includes generating a first repeated sequence, and
generating the second synchronization field includes generating a second repeated sequence different than the first repeated sequence.

8. A method according to claim 5, wherein generating the first preamble portion based on whether the PHY mode is the first PHY mode or the second PHY mode further includes
generating a first start frame delimiter field when the PHY mode is the first PHY mode, wherein the first start frame delimiter field follows the first synchronization field, and
generating a second start frame delimiter field when the PHY mode is the second PHY mode, wherein the second start frame delimiter field follows the second synchronization field and is different than the first start frame delimiter field.

9. A method according to claim 8, wherein
the one or more long training fields of the second preamble portion immediately follow the first start frame delimiter field when the PHY mode is the first PHY mode, and
the one or more long training fields of the second preamble portion immediately follow the second start frame delimiter field when the PHY mode is the second PHY mode.

10. A method according to claim 1, wherein generating the first preamble portion based on whether the PHY mode is the first PHY mode or the second PHY mode includes
generating a synchronization field,
generating a first start frame delimiter field when the PHY mode is the first PHY mode, wherein the first start frame delimiter field follows the synchronization field, and
generating a second start frame delimiter field when the PHY mode is the second PHY mode, wherein the second start frame delimiter field follows the synchronization field and is different than the first start frame delimiter field.

11. A method according to claim 1, wherein
generating the first preamble portion based on whether the PHY mode is the first PHY mode or the second PHY mode includes generating the first preamble portion based on whether the PHY mode is the first PHY mode, the second PHY mode, or a third PHY mode, and
the OFDM portion is clocked at a third clock rate lower than the second clock rate when the PHY mode is the third PHY mode.

12. A communication device comprising:
a network interface configured to
generate a first preamble portion of a data unit based on whether a physical layer (PHY) mode is a first PHY mode or a second PHY mode; and
generate an OFDM portion of the data unit, wherein the OFDM portion
follows the first preamble portion,
includes a second preamble portion including one or more long training fields,
is clocked at a first clock rate when the PHY mode is the first PHY mode, and
is clocked at a second clock rate lower than the first clock rate when the PHY mode is the second PHY mode.

13. A communication device according to claim 12, wherein the network interface is configured to generate the first preamble portion by
using the first clock rate when the PHY mode is the first PHY mode, and
using the second clock rate when the PHY mode is the second PHY mode.

14. A communication device according to claim 12, wherein the network interface is configured to generate the first preamble portion by
generating a first number of repetitions of a sequence when the PHY mode is the first PHY mode, and
generating a second number of repetitions of the sequence when the PHY mode is the second PHY mode, wherein the second number of repetitions is greater than the first number of repetitions.

15. A communication device according to claim 12, wherein the network interface is configured to generate the first preamble portion by,
when the PHY mode is the first PHY mode,
generating a first number of repetitions of a sequence, and
when the PHY mode is the second PHY mode,
generating a second number of repetitions of the sequence, wherein the second number of repetitions is the same as or greater than the first number of repetitions, and
at least one of:
(i) when the PHY mode is the first PHY mode, augmenting the first preamble portion using a first cover code, wherein the first cover code is not used to augment first preamble portion when the PHY mode is the second PHY mode, and
(ii) when the PHY mode is the second PHY mode, augmenting the first preamble portion using a second cover code different than the first cover code, wherein the second cover code is not used to augment first preamble portion when the PHY mode is the first PHY mode.

16. A communication device according to claim 12, wherein the network interface is configured to generate the first preamble portion by
generating a first synchronization field when the PHY mode is the first PHY mode, and
generating a second synchronization field different than the first synchronization field when the PHY mode is the second PHY mode.

17. A communication device according to claim 16, wherein
the first synchronization field includes a first repeated sequence, and
the second synchronization field includes a second repeated sequence different than the first repeated sequence.

18. A communication device according to claim 16, wherein the network interface is further configured to generate the first preamble portion by
generating a first start frame delimiter field when the PHY mode is the first PHY mode, wherein the first start frame delimiter field follows the first synchronization field, and
generating a second start frame delimiter field when the PHY mode is the second PHY mode, wherein the second start frame delimiter field follows the second synchronization field and is different than the first start frame delimiter field.

19. A communication device according to claim 12, wherein the network interface is configured to generate the first preamble portion by
generating a synchronization field,
generating a first start frame delimiter field when the PHY mode is the first PHY mode, wherein the first start frame delimiter field follows the synchronization field, and
generating a second start frame delimiter field when the PHY mode is the second PHY mode, wherein the second start frame delimiter field follows the synchronization field and is different than the first start frame delimiter field.

* * * * *